US011049398B2

(12) United States Patent
Horita et al.

(10) Patent No.: US 11,049,398 B2
(45) Date of Patent: Jun. 29, 2021

(54) SURROUNDING ENVIRONMENT RECOGNIZING APPARATUS

(71) Applicant: HITACHI AUTOMOTIVE SYSTEMS, LTD., Hitachinaka (JP)

(72) Inventors: Yuki Horita, Tokyo (JP); Shigenori Hayase, Hitachinaka (JP); Makoto Kudo, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 199 days.

(21) Appl. No.: 16/306,913

(22) PCT Filed: Jun. 2, 2017

(86) PCT No.: PCT/JP2017/020722
§ 371 (c)(1),
(2) Date: Dec. 4, 2018

(87) PCT Pub. No.: WO2017/217265
PCT Pub. Date: Dec. 21, 2017

(65) Prior Publication Data
US 2019/0333386 A1  Oct. 31, 2019

(30) Foreign Application Priority Data

Jun. 17, 2016  (JP) .............................. JP2016-120935

(51) Int. Cl.
*G08G 1/16* (2006.01)
*G01C 21/34* (2006.01)
(52) U.S. Cl.
CPC ........... *G08G 1/16* (2013.01); *G01C 21/3461* (2013.01)
(58) Field of Classification Search
CPC .............................. G08G 1/16; G01C 21/3461
See application file for complete search history.

(56) References Cited

U.S. PATENT DOCUMENTS 6,577,334 B1 * 6/2003 Kawai ................ B60G 17/0165
                                                    348/148
7,663,475 B2 * 2/2010 Kudo ................... B62D 15/029
                                                    340/435
(Continued)

FOREIGN PATENT DOCUMENTS

DE   10 2011 106 176 A1   2/2012
DE   10 2013 015 028 A1   3/2015
(Continued)

OTHER PUBLICATIONS

International Search Report of PCT/JP2017/020722 dated Aug. 22, 2017.
(Continued)

*Primary Examiner* — Peter D Nolan
*Assistant Examiner* — Wae L Louie
(74) *Attorney, Agent, or Firm* — Mattingly & Malur, PC

(57) ABSTRACT

A surrounding environment recognizing apparatus that is mounted on a vehicle and recognizes a surrounding environment of the vehicle includes: an own vehicle information acquiring unit that acquires own vehicle information about motion of the vehicle; a surrounding environment factor acquiring unit that acquires surrounding environment factor information about an environment factor around the vehicle; a time-of-presence range determining unit that determines, based on the own vehicle information, an own vehicle time-of-presence range representing a time-of-presence range of the vehicle for each position around the vehicle; and a risk-of-driving determining unit that determines a risk of driving in an area around the vehicle based on the own vehicle time-of-presence range and the surrounding environment factor information.

13 Claims, 13 Drawing Sheets

(56) References Cited

U.S. PATENT DOCUMENTS

| | | | | |
|---|---|---|---|---|
| 8,838,372 | B2* | 9/2014 | Noda | B60W 30/0953 |
| | | | | 701/301 |
| 9,452,759 | B2* | 9/2016 | Tsuchida | B60W 30/09 |
| 9,771,071 | B2* | 9/2017 | Hassani | B60W 30/0953 |
| 9,852,638 | B2* | 12/2017 | Djordjevic | G08G 9/00 |
| 10,421,459 | B2* | 9/2019 | Goldman-Shenhar | |
| | | | | B60W 50/08 |
| 2007/0021915 | A1* | 1/2007 | Breed | G08G 1/164 |
| | | | | 701/301 |
| 2010/0010699 | A1* | 1/2010 | Taguchi | G08G 1/167 |
| | | | | 701/23 |
| 2012/0283895 | A1* | 11/2012 | Noda | B60W 30/0953 |
| | | | | 701/1 |
| 2017/0072851 | A1* | 3/2017 | Shenoy | G08G 1/096775 |
| 2019/0138029 | A1* | 5/2019 | Ryll | G05D 1/101 |
| 2019/0250622 | A1* | 8/2019 | Nister | B60W 60/0015 |
| 2019/0333386 | A1* | 10/2019 | Horita | B60W 30/0956 |

FOREIGN PATENT DOCUMENTS

| | | |
|---|---|---|
| JP | 2002-140799 A | 5/2002 |
| JP | 2008-117082 A | 5/2008 |
| JP | 2011-170762 A | 9/2011 |
| JP | 2011-253302 A | 12/2011 |
| JP | 2012-234407 A | 11/2012 |
| JP | 2013-004021 A | 1/2013 |
| JP | 2013-152551 A | 8/2013 |
| JP | 2014-098964 A | 5/2014 |

OTHER PUBLICATIONS

Extended European Search Report received in corresponding European Application No. 17813164.5 dated Mar. 11, 2020.

Japanese Office Action received in corresponding Japanese Application No. 2016-120935 dated Jun. 18, 2019.

Japanese Office Action received in corresponding Japanese Application No. 2019-210581 dated Oct. 6, 2020.

* cited by examiner

OWN VEHICLE TIME-OF-PRESENCE
RANGE DETERMINATION PROCESS FLOW 600

SURROUNDING ENVIRONMENT RECOGNIZING APPARATUS

TECHNICAL FIELD

The present invention relates to a surrounding environment recognizing apparatus.

BACKGROUND ART

Conventionally, apparatuses that calculate risks of driving of own vehicles posed by various obstacles that are present around the own vehicles, and provide driving assistance according to the calculated risks have been proposed. The following Patent Literature 1 discloses a technique that is related to such apparatuses and generates a risk potential map that represents a risk of collision between an own vehicle and an object for each position based on an overlap between the risk potential of the own vehicle calculated based on a predicted driving range of the own vehicle and the risk potential of the object calculated based on a predicted movement range of the object.

CITATION LIST

Patent Literature

Patent Literature 1: Japanese Unexamined Patent Application Publication No. 2011-253302

SUMMARY OF INVENTION

Technical Problem

Since the technique disclosed in Patent Literature 1 evaluates the risk of collision based on the degree of overlap between the risk potential based on the predicted driving range of the own vehicle and the predicted movement range of the object, it is not possible to evaluate whether the own vehicle and the object really cross at a time point. Because of this, even in the case where the object is a moving body, and it is fundamentally not possible for the own vehicle and the moving body to cross at a time point, if the predicted movement range spatially overlaps the predicted driving range of the own vehicle, the overlapping portion is in some cases set as a position where the risk of collision is high, despite the fact that there is actually no risk of collision. As can be seen, in conventional techniques, the risk of driving of a vehicle cannot be evaluated highly precisely considering changes over time of the surrounding environment of the vehicle.

Solution to Problem

A surrounding environment recognizing apparatus according to the present invention is mounted on a vehicle and recognizes a surrounding environment of the vehicle, and includes: an own vehicle information acquiring unit that acquires own vehicle information about motion of the vehicle; a surrounding environment factor acquiring unit that acquires surrounding environment factor information about an environment factor around the vehicle; a time-of-presence range determining unit that determines, based on the own vehicle information, an own vehicle time-of-presence range representing a time-of-presence range of the vehicle for each position around the vehicle; and a risk-of-driving determining unit that determines a risk of driving in an area around the vehicle based on the own vehicle time-of-presence range and the surrounding environment factor information.

Advantageous Effects of Invention

According to the present invention, the risk of driving of a vehicle can be evaluated highly precisely considering changes over time of the surrounding environment of the vehicle.

DESCRIPTION OF EMBODIMENTS

Hereinafter, embodiments of the present invention are explained with reference to the drawings.

Figure 1:
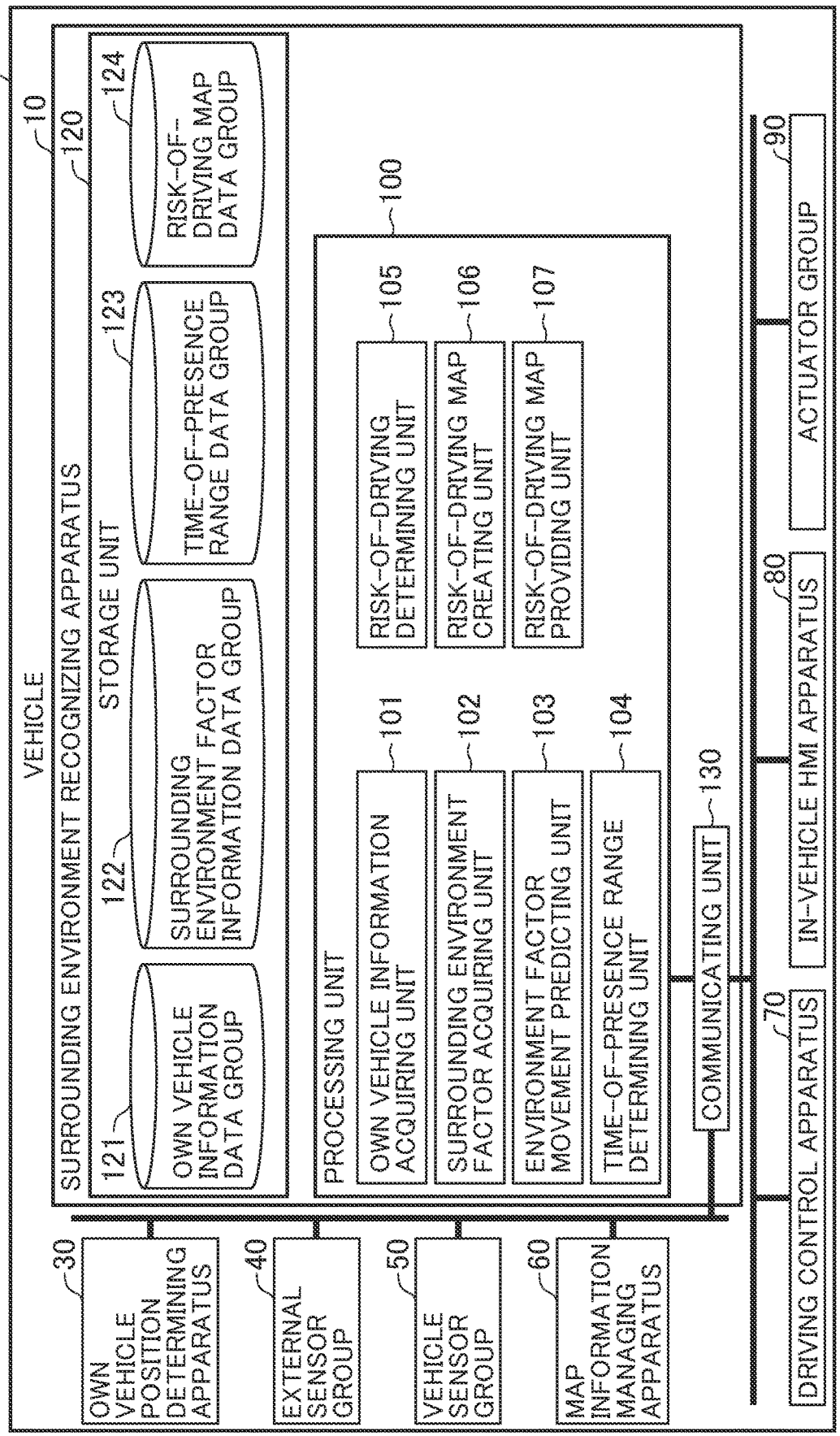
FIG. 1 is a function block diagram showing one example of the configuration of a driving control system according to one embodiment of the present invention.

FIG. 1 is a function block diagram showing one example of the configuration of a driving control system. 1 according to one embodiment of the present invention. The driving control system 1 according to the present embodiment is a system that is mounted on a vehicle 2. The driving control system is for: judging current and future risks in driving of the vehicle 2 while at the same time recognizing the situation about the driving road and/or obstacles such as nearby vehicles around the vehicle 2; and providing and performing appropriate driving assistance and driving control. As shown in FIG. 1, the driving control system 1 includes and is constituted by a surrounding environment recognizing apparatus 10, an own vehicle position determining apparatus 30, an external sensor group 40, a vehicle sensor group 50, a map information managing apparatus 60, a driving control apparatus 70, an in-vehicle HMI apparatus 80, an actuator group 90 and the like.

The surrounding environment recognizing apparatus 10 is, for example, an ECU (Electronic Control Unit) or the like mounted on the vehicle 2, and has a processing unit 100, a storage unit 120 and a communicating unit 130. It should be noted that the form of the surrounding environment recognizing apparatus 10 is not particularly limited, and units other than an ECU may also be used as the surrounding environment recognizing apparatus 10. For example, the surrounding environment recognizing apparatus 10 may also be integrated into the driving control apparatus 70, the external sensor group 40 or the like.

The processing unit 100 includes and is constituted by, for example, a CPU (Central Processing Unit: Central Processing Unit) and a memory such as a RAM (Random. Access Memory). As units for realizing functions of the surrounding environment recognizing apparatus 10, the processing unit 100 has an own vehicle information acquiring unit 101, a surrounding environment factor acquiring unit 102, an environment factor movement predicting unit 103, a time-of-presence range determining unit 104, a risk-of-driving determining unit 105, a risk-of-driving map creating unit 106 and a risk-of-driving map providing unit 107. The processing unit 100 executes a predetermined operation program stored on the storage unit 120 to thereby perform processes corresponding to these units.

As own vehicle information related to motion of the vehicle 2, the own vehicle information acquiring unit 101 acquires, from the own vehicle position determining apparatus 30 and/or the vehicle sensor group 50, information such as the position, driving speed, steering angle, accelerator manipulation amount or brake manipulation amount of the vehicle 2, for example. The own vehicle information acquired by the own vehicle information acquiring unit 101 is stored on the storage unit 120 as an own vehicle information data group 121.

As surrounding environment factor information about various environment factors around the vehicle 2, the surrounding environment factor acquiring unit 102 acquires, from the external sensor group 40 and/or the map information managing apparatus 60, information about obstacles present around the vehicle 2 or information about feature objects indicating features of the road that are around the vehicle 2 or the like, for example. It should be noted that obstacles present around the vehicle 2 are, for example, moving bodies such as other vehicles, bicycles or pedestrians moving about the vehicle 2, parked vehicles, fallen objects, installed objects or the like that are stationary on the road about the vehicle 2. The surrounding environment factor information acquired by the surrounding environment factor acquiring unit 102 is stored on the storage unit 120 as a surrounding environment factor information data group 122.

Based on the surrounding environment factor information data group 122 stored on the storage unit 120, the environment factor movement predicting unit 103 predicts how moving bodies such as other vehicles, bicycle or pedestrians included in environment factors detected by the external sensor group 40 will move in the future. Results of prediction about movement of moving bodies made by the environment factor movement predicting unit 103 are added to surrounding environment factor information corresponding to those moving bodies, and are stored on the storage unit 120 as the surrounding environment factor information data group 122.

Based on the own vehicle information data group 121 stored on the storage unit 120 and/or results of prediction about movement of moving bodies made by the environment factor movement predicting unit 103, the time-of-presence range determining unit 104 determines a time range in which each of the vehicle 2 and environment factors can be present at a predetermined position around the vehicle 2. In the following explanation, time-of-presence ranges of the vehicle 2 and environment factors determined by the time-of-presence range determining unit 104 are referred to as an own vehicle time-of-presence range and environment factor time-of-presence ranges, respectively. Information about the own vehicle time-of-presence range and environment factor time-of-presence ranges determined by the time-of-presence range determining unit 104 are stored on the storage unit 120 as a time-of-presence range data group 123.

Based on the own vehicle time-of-presence range and environment factor time-of-presence ranges represented by the time-of-presence range data group 123 stored on the storage unit 120 and/or the surrounding environment factor information represented by the surrounding environment factor information data group 122 stored on the storage unit 120, the risk-of-driving determining unit 105 determines the risk of driving in an area around the vehicle 2.

Based on a result of determination about the risk of driving made by the risk-of-driving determining unit 105, the risk-of-driving map creating unit 106 creates a risk-of-driving map representing a relationship between each position around the vehicle 2 and the risk of driving. Information about the risk-of-driving map created by the risk-of-driving map creating unit 106 is stored on the storage unit 120 as a risk-of-driving map data group 124.

Based on the risk-of-driving map data group 124 stored on the storage unit 120, the risk-of-driving map providing unit 107 provides the information about the risk-of-driving map of the vehicle 2 to other functions in the surrounding environment recognizing apparatus 10 and/or to apparatuses other than the surrounding environment recognizing apparatus 10 that are mounted on the vehicle 2.

The storage unit 120 includes and is constituted by a storage device such as a HDD (Hard Disk Drive), a flash memory or a ROM (Read Only Memory), for example. The storage unit 120 stores therein programs to be executed by the processing unit 100, data groups necessary for realizing the currently discussed system, and the like. In the present embodiment, in particular, the own vehicle information data group 121, surrounding environment factor information data group 122, time-of-presence range data group 123 and risk-of-driving map data group 124 are stored on the storage unit 120 as information for realizing functions of the surrounding environment recognizing apparatus 10.

The own vehicle information data group 121 is an aggregate of data about the vehicle 2. For example, the position of the vehicle 2 acquired from the own vehicle position determining apparatus 30 and/or information about the state of the vehicle 2 acquired from the vehicle sensor group 50 are/is included in the own vehicle information data group 121.

The surrounding environment factor information data group 122 is an aggregate of data about a surrounding environment of the vehicle 2. For example, digital road map data about the road around the vehicle 2 acquired from the map information managing apparatus 60, recognition data about various environment factors around the vehicle 2 acquired from the external sensor group 40, data generated by integrating them, or the like is included in the surrounding environment factor information data group 122. In addition, data indicating results of prediction about movement of moving bodies made by the environment factor movement predicting unit 103 is also included in the surrounding environment factor information data group 122. It should be noted that the surrounding environment factor information data group 122 includes data like the ones mentioned above set for each among a plurality of environment factors. "Environment factors" mentioned here mean information factors that affect driving of the vehicle 2. For example, information factors such as: obstacles such as moving bodies such as other vehicles or pedestrians around the vehicle 2, or fallen objects; the road geometry such as boundary information about lanes and/or the road; or traffic rules such as speed restrictions, one-way traffics or signals are included in the abovementioned "environment factors". These information factors have various natures, but share a nature that they all give meanings to positions or regions in a space around the vehicle 2. Because of this, in the present embodiment, these information factors are treated in the same framework, "environment factors", and are regarded as target data to be accumulated in the surrounding environment factor information data group 122.

The time-of-presence range data group 123 is an aggregate of data indicating a time range in which the vehicle 2 or an environment factor can be present at each position around the vehicle 2, that is, the aforementioned own vehicle time-of-presence range or environment factor time-of-presence range. It should be noted that "time" in the present embodiment is indicated in a time series defined using a certain reference time point as a reference point. Preferably, using the current time point as a reference time point, in which future time zone (for example, after two to three seconds) the vehicle 2 or an environment factor can be present at each position around the current position of the vehicle 2 can be indicated by the own vehicle time-of-presence range or environment factor time-of-presence range. Here, the abovementioned "time range" needs not be time with a certain range, but a certain particular time point may also be regarded as the own vehicle time-of-presence range or environment factor time-of-presence range. In addition, a probability distribution over time about presence of the vehicle 2 or an environment factor at each position around the current position of the vehicle 2, that is, a distribution of probability of presence of the vehicle 2 or an environment factor at predetermined time intervals at each position may also be indicated as the own vehicle time-of-presence range or environment factor time-of-presence range.

The risk-of-driving map data group 124 is an aggregate of data about a risk-of-driving map indicating a relationship between each position around the vehicle 2 and a risk of driving of the vehicle 2, that is, a risk to be faced by the vehicle 2 when the vehicle 2 drives through the position.

The communicating unit 130 transmits and/or receives data to and from other apparatuses mounted on the vehicle 2 based on various protocols. The communicating unit 130 includes and is constituted by a network card or the like conforming to a communication standard such as Ethernet (registered trademark) or a CAN (Controller Area Network), for example. It should be noted that the mode of connection between the communicating unit 130 and other apparatuses mounted on the vehicle 2 is not limited to wired connection like Ethernet, but may also be near field wireless connection such as Bluetooth (registered trademark) or a wireless LAN (Local Area Network).

The own vehicle position determining apparatus 30 is an apparatus that measures the geographical position of the vehicle 2 and provides information thereof. The own vehicle position determining apparatus 30 is constituted by a global navigation satellite system (GNSS) receiving apparatus, for example. In that case, the own vehicle position determining apparatus 30 may be configured to simply provide a position-measurement result based on radio waves received from a GNSS satellite. Alternatively, the own vehicle position determining apparatus 30 may be configured to perform interpolation or error correction on a position-measurement result based on radio waves received from a GNSS satellite, utilizing information that is about a moving speed, azimuth of movement or the like of the vehicle 2 and can be acquired from the external sensor group 40 and/or vehicle sensor group 50.

The external sensor group 40 is a sensor group that can recognize obstacles that are present in a certain range around the vehicle 2 (other vehicles, bicycles, pedestrians, fallen objects, etc.) or feature objects (road signs, white lines, landmarks, etc.). The external sensor group 40 is constituted by a camera apparatus, a radar, a laser radar, a sonar or the like, for example. The external sensor group 40 outputs information about detected obstacles or feature objects around the vehicle 2 (relative distances, relative angles or the like to the vehicle 2, for example) onto an in-vehicle network such as a CAN to which the external sensor group 40 and/or surrounding environment recognizing apparatus 10 are/is connected. The surrounding environment recognizing apparatus 10 is configured to be able to acquire an output result from the external sensor group 40 through this in-vehicle network. It should be noted that although in the present embodiment, a configuration in which a process of detecting obstacles and/or feature objects is performed by the external sensor group 40 is adopted, the process of detecting them may be performed by the surrounding environment recognizing apparatus 10 and/or another apparatus using signals and/or data output from the external sensor group 40.

The vehicle sensor group 50 is an apparatus group that detects states of various parts related to motion of the vehicle 2 (for example, a driving speed, steering angle, accelerator manipulation amount, brake manipulation amount, etc.). The vehicle sensor group 50 periodically outputs these detected state quantities onto an in-vehicle network such as a CAN, for example. The surrounding environment recognizing apparatus 10 and/or another apparatus connected to the in-vehicle network are/is configured to be able to acquire the state quantities of various parts output from the vehicle sensor group 50 through the in-vehicle network.

The map information managing apparatus 60 is an apparatus that manages and provides digital map information about an area around the vehicle 2. The map information managing apparatus 60 is constituted by a navigation apparatus or the like, for example. The map information managing apparatus 60 includes digital road map data about a predetermined geographical area around the vehicle 2, for example, and is configured to identify the current position of the vehicle 2 on the map, that is, the road and/or lane on which the vehicle 2 is driving, based on positional information about the vehicle 2 determined by the own vehicle position determining apparatus 30. In addition, it is configured to provide, to the surrounding environment recognizing apparatus 10 through an in-vehicle network such as a CAN, map data about the identified current position of the vehicle 2 and/or an area around the current position.

The driving control apparatus 70 is an ECU for realizing advanced driver assistance systems (ADAS: Advanced Driver Assistance Systems) of the vehicle 2 for the purpose of enhancing fuel efficiency, safety, convenience or the like of the vehicle 2. The driving control apparatus 70 for example automatically controls acceleration/deceleration and/or steering of the vehicle 2 by issuing an instruction to the actuator group 90, provides information or outputs warning to a driver through the in-vehicle HMI apparatus 80, and so on based on information output from the surrounding environment recognizing apparatus 10.

The in-vehicle HMI apparatus 80 is constituted by a speaker, a display apparatus and the like mounted on the vehicle 2. The in-vehicle HMI apparatus 80 is configured to perform, through sound or a screen, notification to a driver about driving assistance of the vehicle 2 based on information output from the surrounding environment recognizing apparatus 10 and/or information output from the driving control apparatus 70.

The actuator group 90 is an apparatus group that controls control factors such as steering, braking or acceleration that determine motion of the vehicle 2. The actuator group 90 is configured to control motion of the vehicle 2 based on information about manipulation by a driver of a steering wheel, a brake pedal, an accelerator pedal or the like and/or target control values output from the driving control apparatus 70.

Figure 2:
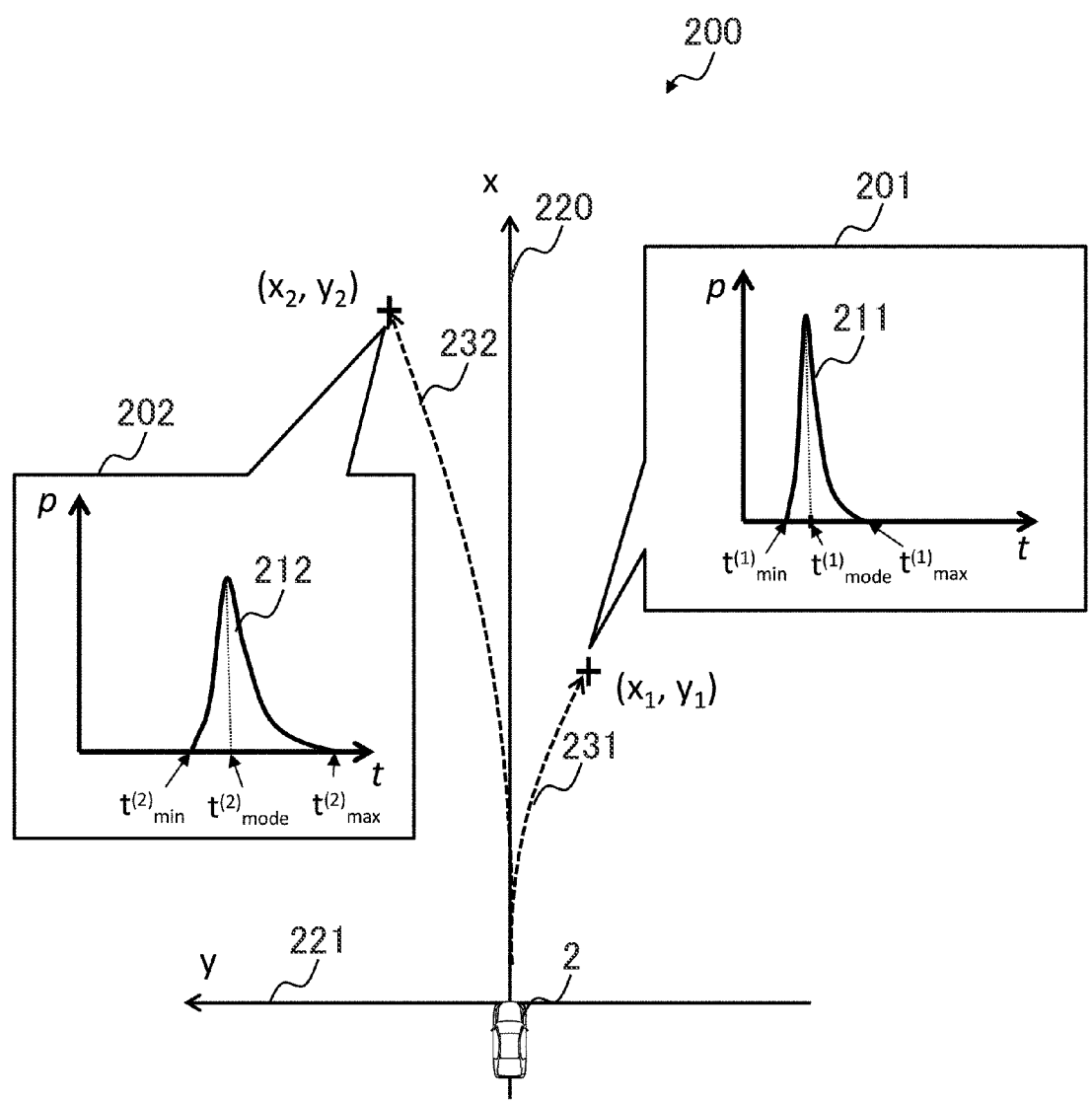
FIG. 2 is a figure showing one example of a time-of-presence range map.

FIG. 2 is a figure showing one example of a time-of-presence range map represented by the time-of-presence range data group 123 in the present embodiment.

The time-of-presence range data group 123 represents a relationship between relative positions around the vehicle 2 and time ranges in which the vehicle 2 or an environment factor can be present at the positions. In FIG. 2, own vehicle time-of-presence range information 200 indicating time-of-presence ranges of the vehicle 2 is shown as one example of the time-of-presence range data group 123. As shown in FIG. 2, the own vehicle time-of-presence range information 200 indicates, as information corresponding to a function, a time-of-presence range T(x, y) of the vehicle 2 for each position of coordinate values (x, y) represented by individual variables x and y in a predetermined region (for example, −10 m to 100 m in the x-direction, −20 m to 20 m in the y-direction, and the like) defined in an x-y coordinate system centered on the position of the vehicle 2 at a predetermined reference time point (for example, the current position). Here, the positive direction of the x-axis 220 corresponds to the front direction of the vehicle 2, and the positive direction of the y-axis 221 corresponds to the leftward direction of the vehicle 2. It should be noted that values that the coordinate values (x, y) assume may be continuous values (for example, values represented by a function) or may be discrete values (for example, values defined on a grid). In the present specification, explanations are given assuming that the coordinate values (x, y) assume discrete values, and values that indicate a time-of-presence range T(x, y) of the vehicle 2 (or function parameters corresponding to the time-of-presence range T(x, y) of the vehicle 2, or the like) are represented on a grid map. Hereinafter, data of the time-of-presence range data group 123 representing a relationship between the coordinate values (x, y) and the time-of-presence range T(x, y) of the vehicle 2 is referred to as an own vehicle time-of-presence range map.

In an own vehicle time-of-presence range map in FIG. 2, time-of-presence ranges T(x1, y1), T(x2, y2) of the vehicle 2 at two points (x1, y1), (x2, y2) are shown as time probability distributions 201, 202, as an example. It should be noted that the map includes similar information about coordinate values (x, y) other than them. Here, the time-of-presence range T (x, y) of the vehicle 2 is represented as, for example, a time probability distribution by a probability density function p(t) indicating a relationship between times t and probabilities p of the vehicle 2 being present at the position of a coordinate value (x, y) at the times t. For example, the time probability distribution 201 representing the time-of-presence range of the vehicle 2 at (x1, y1) is represented by a probability density function p(t) shown in a graph 211, and the time probability distribution 202 representing the time-of-presence range of the vehicle 2 at (x2, y2) is represented by a probability density function p(t) shown in a graph 212.

Alternatively, the time-of-presence range T(x, y) may be information indicating a time range (time zone) not including probabilistic information. For example, the time-of-presence range of the vehicle 2 at (x1, y1) can be represented as a time range in which the value of p exists in the probability density function p(t) shown in the graph 211, that is, a time range corresponding to $t^{(1)}_{min}$ to $t^{(1)}_{max}$. Furthermore, the time-of-presence range T(x, y) may be information indicating a representative point not having a temporal range. For example, the time-of-presence range of the vehicle 2 at (x1, y1) can be represented as a time at which the value of p shows the mode in the probability density function p(t) shown in graph 211, that is, the time point corresponding to $t^{(1)}_{mode}$.

It should be noted that although FIG. 2 shows an example of the own vehicle time-of-presence range map related to the vehicle 2, a time-of-presence range map related to each environment factor around the vehicle 2 may also be similarly included in the time-of-presence range data group 123. In that case, the time-of-presence range map related to each environment factor is also represented by a time probability distribution and/or time range in an x-y coordinate system centered on the vehicle 2 like the one shown in FIG. 2. Hereinafter, data of the time-of-presence range data group 123 representing a relationship between the coordinate values (x, y) and the time-of-presence range E(x, y) of each environment factor is referred to as an environment factor time-of-presence range map. Alternatively, since a stationary environment factor has a position which does not change over time, only positional information may be indicated in the environment factor time-of-presence range map, and temporal information may not be included therein.

Figure 3:
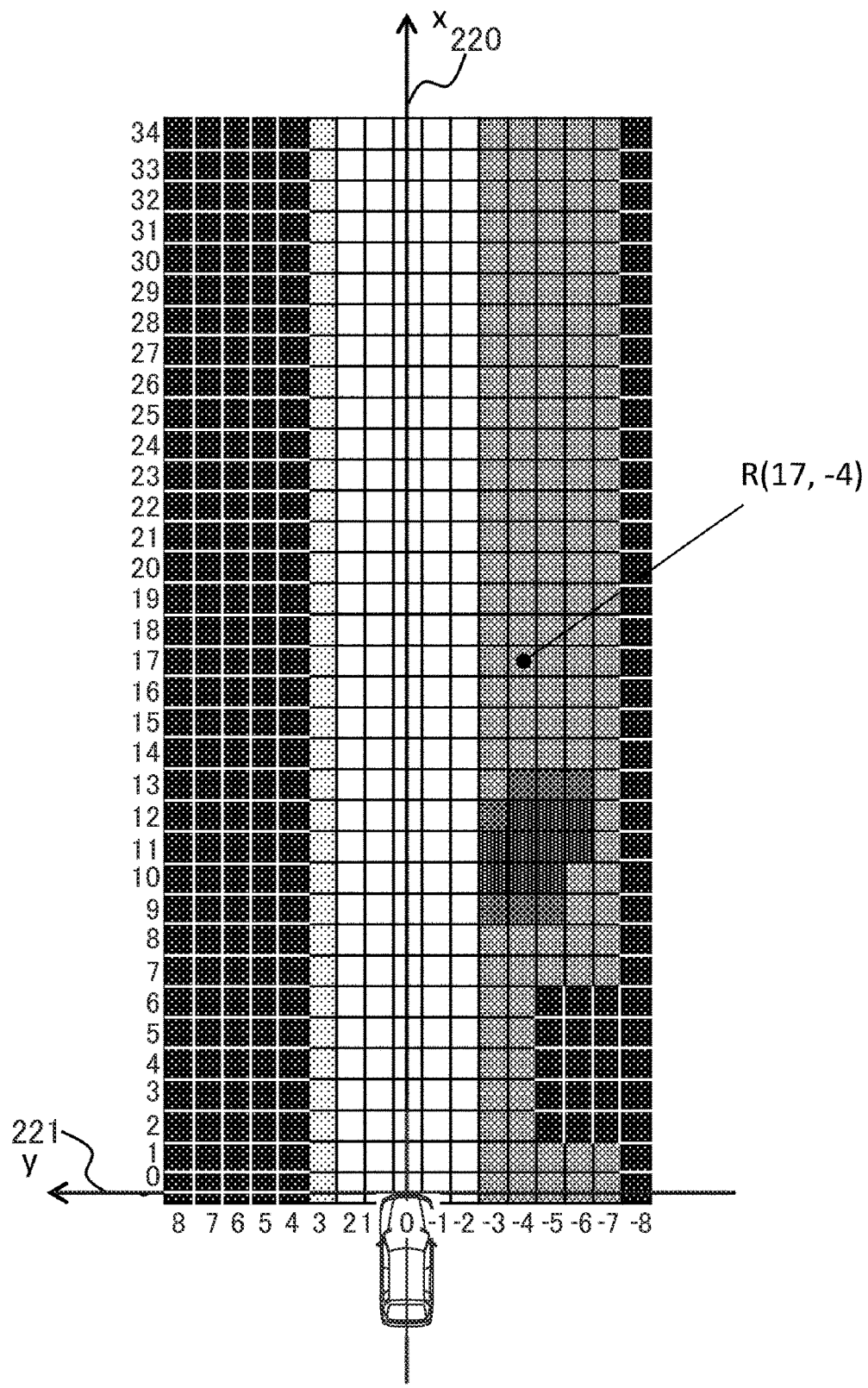
FIG. 3 is a figure showing one example of a risk-of-driving map.

FIG. 3 is a figure showing one example of the risk-of-driving map represented by the risk-of-driving map data group 124 in the present embodiment.

The risk-of-driving map data group 124 represents the risk of driving of the vehicle 2 at each position around the vehicle 2. As shown in FIG. 3, the risk-of-driving map data group 124 indicates, as information corresponding to a function, a risk of driving R(x, y) of the vehicle 2 for each position of coordinate values (x, y) represented by individual variables x and y in a predetermined region (for example, −10 m to 100 m in the x-direction, −20 m to 20 m in the y-direction, and the like) defined in an x-y coordinate system centered on the current position of the vehicle 2, for example. Here, similar to the time-of-presence range map exemplified in FIG. 2, the positive direction of the x-axis 220 corresponds to the front direction of the vehicle 2, and the positive direction of the y-axis 221 corresponds to the leftward direction of the vehicle 2. It should be noted that similar to FIG. 2, values that the coordinate values (x, y) assume may be continuous values (for example, values represented by a function) or may be discrete values (for example, values defined on a grid). In the example of FIG. 3, values of the risks of driving R(x, y) are represented on a grid map assuming that the coordinate values (x, y) are discrete values.

In FIG. 3, for example, the value of the risk of driving R(17, −4) stored in a cell of the coordinate value (17, −4) corresponds to the risk of driving of the vehicle 2 for this cell. Here, the value of the risk of driving R(x, y) stored in each cell of FIG. 3 is a value obtained by integrating and normalizing risks that are posed by interaction between the vehicle 2 and environment factors around the vehicle 2 in the cell. The larger the value is, the higher the risk of the vehicle 2 driving there is. In the example of FIG. 3, the value of the risk of driving R(x, y) of the vehicle 2 for each cell is represented by hatching. The darker the hatching is, the higher the risk of driving there is.

Next, operation of the driving control system 1 is explained using FIG. 4 to FIG. 12. The surrounding environment recognizing apparatus 10 of the driving control system 1 in the present embodiment executes a surrounding environment recognition process like the one explained below based on information about the vehicle 2 and/or environment factors around the vehicle 2 acquired individually from the own vehicle position determining apparatus 30, external sensor group 40, vehicle sensor group 50 and map information managing apparatus 60, which are external apparatuses, and creates a risk-of-driving map of an area around the vehicle 2 like the aforementioned map. Then, it outputs the generated risk-of-driving map to the driving control apparatus 70 and/or in-vehicle HMI apparatus 80 to thereby provide driving assistance of the vehicle 2.

Figure 4:
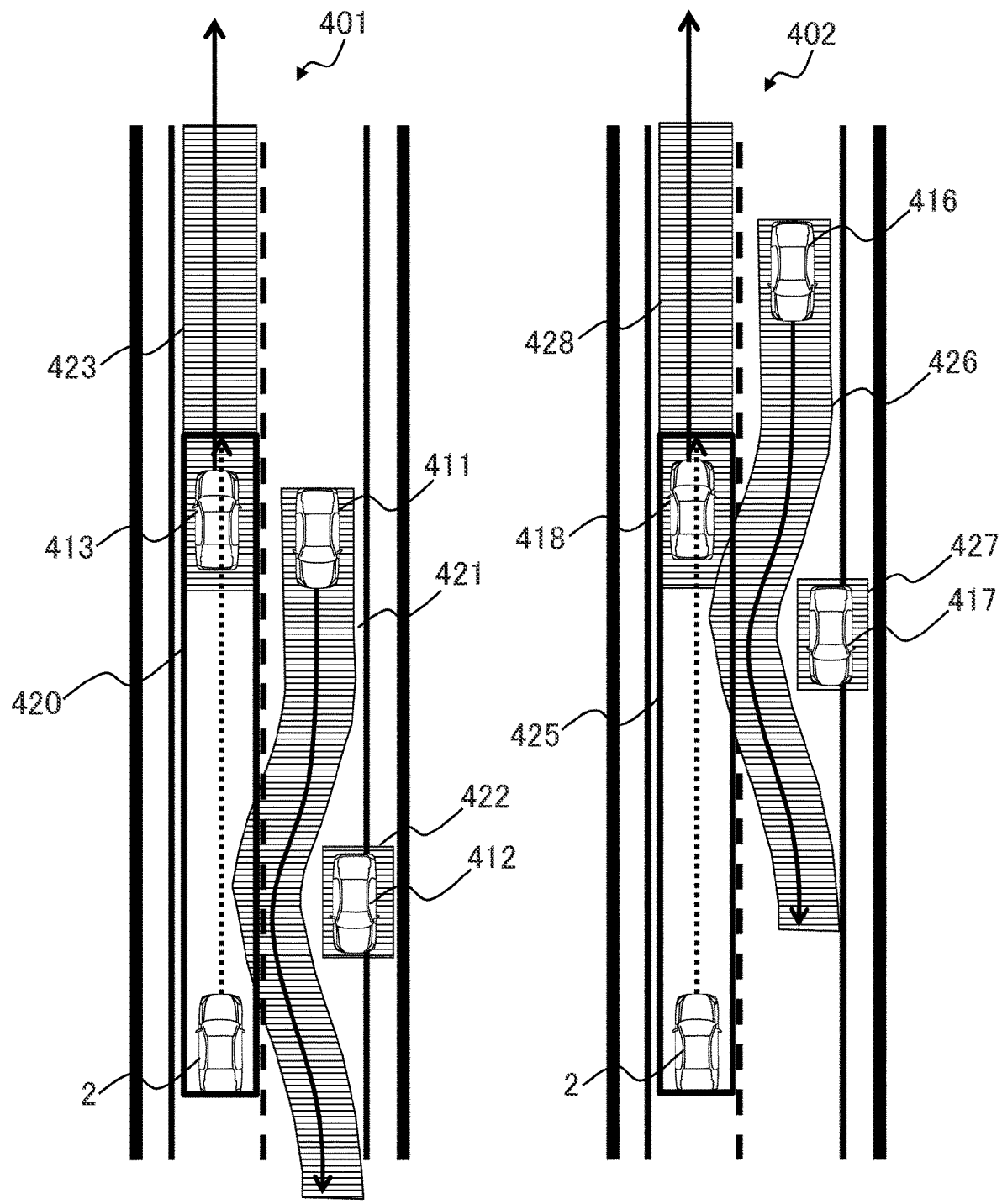
FIG. 4 is a figure showing one example of a driving road environment of a vehicle for explaining a surrounding environment recognition process.

FIG. 4 is a figure showing one example of a driving road environment of the vehicle 2, as an explanatory figure for explaining a surrounding environment recognition process. FIG. 4 shows two scenes 401, 402 about driving road environments, and in both the scenes 401, 402, the vehicle 2 is driving on a road with two opposite lanes. In the scene 401, another vehicle 412 is parked on the road on an oncoming lane near the vehicle 2, and another vehicle 411 is trying to pass the parked vehicle (other vehicle 412). Since this road does not have a sufficient lane width, the other vehicle 411 needs to cross into the oncoming lane (the lane where the vehicle 2 is driving) in the course of passing the parked vehicle. In addition, in front of the vehicle 2, another vehicle 413 is driving at a speed which is about the same as the speed of the vehicle 2.

In the scene 401, regions 421, 422, 423 indicated by hatching indicate the ranges of predicted driving trajectories of the other vehicles 411, 412, 413, respectively. On the other hand, a region 420 indicated by bold lines indicates the range of a predicted driving trajectory of the vehicle 2 assuming that it continues the manner of driving up to the point in time.

In the scene 402, the distances from the vehicle 2 to other vehicles 416, 417 driving on the oncoming lane are longer with respect to the vehicle 2, as compared with those to the other vehicles 411, 412 in the scene 401. That is, the positions of the other vehicle 416 and other vehicle 417 in the scene 402 are shifted forward a little from the perspective of the vehicle 2 as compared with the positions of the other vehicle 411 and other vehicle 412 in the scene 401 while the positional relationship of both the other vehicles is maintained. Accordingly, the fundamental difference between the scene 401 and the scene 402 is timing at which the other vehicle 411 or other vehicle 416 crosses into the driving lane side of the vehicle 2.

Figure 5:
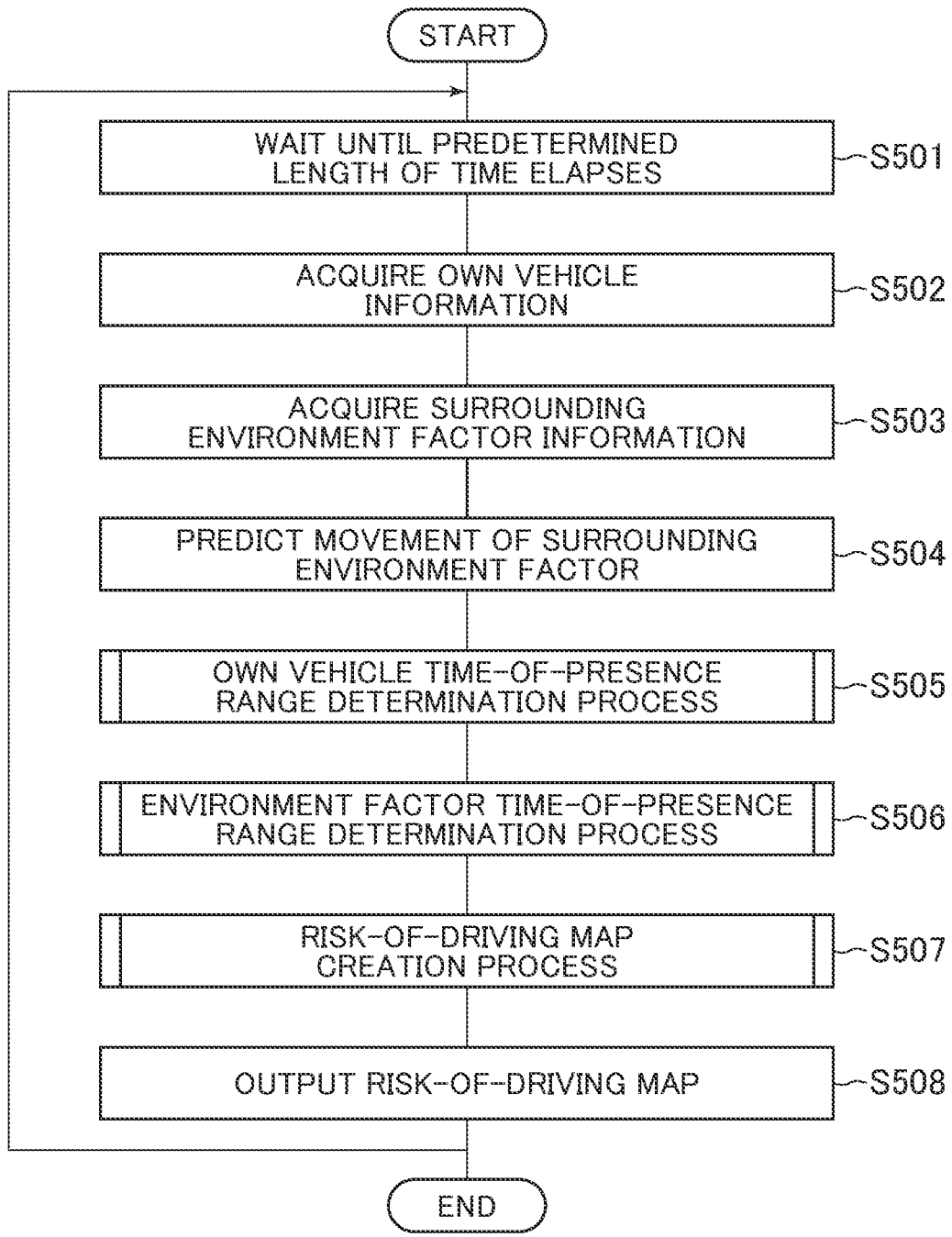
FIG. 5 is a figure showing one example of a flowchart of the surrounding environment recognition process.

FIG. 5 is a figure showing a surrounding environment recognition process flow 500 executed in the driving control system 1 of the present embodiment.

First, at Step S501, the own vehicle information acquiring unit 101 waits until a predetermined length of time elapses. Here, the own vehicle information acquiring unit 101 waits until a length of time elapses after which a trigger is issued for the surrounding environment recognizing apparatus 10 to generate a risk-of-driving map, without proceeding with processes. The trigger may be based on a timer such that risk-of-driving maps are generated at constant time intervals or may be issued on demand when it is sensed necessary to update a risk-of-driving map.

Next, at Step S502, the own vehicle information acquiring unit 101 acquires, from the own vehicle information data group 121 in the storage unit 120, information about the vehicle 2 as own vehicle information necessary for the surrounding environment recognition process. Here, positional information of the vehicle 2 acquired from the own vehicle position determining apparatus 30 and/or information about the state of the vehicle 2 acquired from the vehicle sensor group 50 are/is acquired as the own vehicle information. The information about the state of the vehicle 2 includes, for example, information representing the vehicle speed, longitudinal acceleration, lateral acceleration, states of a brake and/or accelerator of the vehicle 2, and the like. It should be noted that as mentioned above, these pieces of information are acquired by the own vehicle information acquiring unit 101 from the own vehicle position determining apparatus 30 and/or vehicle sensor group 50 at appropriate timing through a vehicle network or the like, and are stored on the storage unit 120 as the own vehicle information data group 121. These pieces of information may include past history information.

Next, at Step S503, the surrounding environment factor acquiring unit 102 acquires, from the surrounding environment factor information data group 122 in the storage unit 120, information about environment factors around the vehicle 2 as surrounding environment factor information necessary for the surrounding environment recognition process. Here, digital road map data about the road around the vehicle 2 acquired from the map information managing apparatus 60 and/or recognition data about various environment factors around the vehicle 2 acquired from the external sensor group 40 are/is acquired as the surrounding environment factor information. The recognition data about environment factors around the vehicle 2 includes information representing cognitive situations such as obstacles (other vehicles, humans, fallen objects, etc.), road geometries (ends of the road, white lines, stop lines, zebra zones, etc.), or road conditions (frozen, puddles, potholes, etc.). It should be noted that as mentioned above, these pieces of information are acquired by the surrounding environment factor acquiring unit 102 from the external sensor group 40 and/or map information managing apparatus 60 at appropriate timing through a vehicle network or the like, and are stored on the storage unit 120 as the surrounding environment factor information data group 122. These pieces of information may be one obtained by appropriate integration through a so-called fusion process. In addition, these pieces of information may include past history information.

Next, at Step S504, the environment factor movement predicting unit 103 predicts how movable environment factors (vehicles, humans, etc.) around the vehicle 2 will move in a predetermined length of time, based on the surrounding environment factor information acquired at Step S503. Here, motion of each environment factor is predicted considering recognition information represented by the surrounding environment factor information related to the environment factor (relative position, direction of movement, speed of movement, etc.) and/or surrounding situations represented by the surrounding environment factor information related to the environment factor (road geometries, traffic rules, obstacles, etc.). For example, in the scene 401 of FIG. 4, the other vehicle 411 driving on the oncoming lane of the vehicle 2 can be predicted to select a driving trajectory to avoid the other vehicle 411 because the other vehicle 411 is parked ahead on the lane. Accordingly, the environment factor movement predicting unit 103 can construct movement prediction information like the one shown as the region 421 as a result of prediction about movement of the other vehicle 411. It should be noted that although in the region 421 of FIG. 4, only a spatial geometrical trajectory is represented, the movement prediction information actually preferably includes temporal information also. For example, the movement prediction information of the other vehicle 411 is represented by positional information of the other vehicle 411 obtained at predetermined time intervals (the position after one second, the position after two seconds, . . . ).

Next, at Step S505, the time-of-presence range determining unit 104 executes an own vehicle time-of-presence range determination process 600 of determining a time-of-presence range map of the vehicle 2 based on the own vehicle information acquired at Step S502. Details of the own vehicle time-of-presence range determination process 600 are explained below using FIG. 6 and FIG. 7.

Next, at Step S506, the time-of-presence range determining unit 104 executes an environment factor time-of-presence range determination process 700 of determining a time-of-presence range map of each environment factor based on a result of surrounding environment factor movement prediction performed at Step S504. Details of the environment factor time-of-presence range determination process 700 are explained below using FIG. 8.

Upon completion of the own vehicle time-of-presence range determination process 600 at Step S505 and the environment factor time-of-presence range determination process 700 at Step S506, the risk-of-driving map creating unit 106 executes a risk-of-driving map creation process 800 of creating a risk-of-driving map of an area around the vehicle 2 at Step S507. Here, based on the time-of-presence range map of the vehicle 2 determined at Step S505, the time-of-presence range maps of the environment factors determined at Step S506 and the surrounding environment factor information acquired at Step S503, a risk-of-driving map of an area around the vehicle 2 is created. Details of the risk-of-driving map creation process 800 are explained below using FIG. 9 to FIG. 13.

Upon completion of the risk-of-driving map creation process 800 at Step S507, the risk-of-driving map providing unit 107 outputs, at Step S508, data of the created risk-of-driving map to the driving control apparatus 70, in-vehicle HMI apparatus 80 or the like.

After the abovementioned processes of Step S501 to S508 are executed, the process returns to Step S501, and these processes are repeatedly executed.

<User's Vehicle Time-of-Presence Range Determination Process 600 (S505)>

Figure 6:
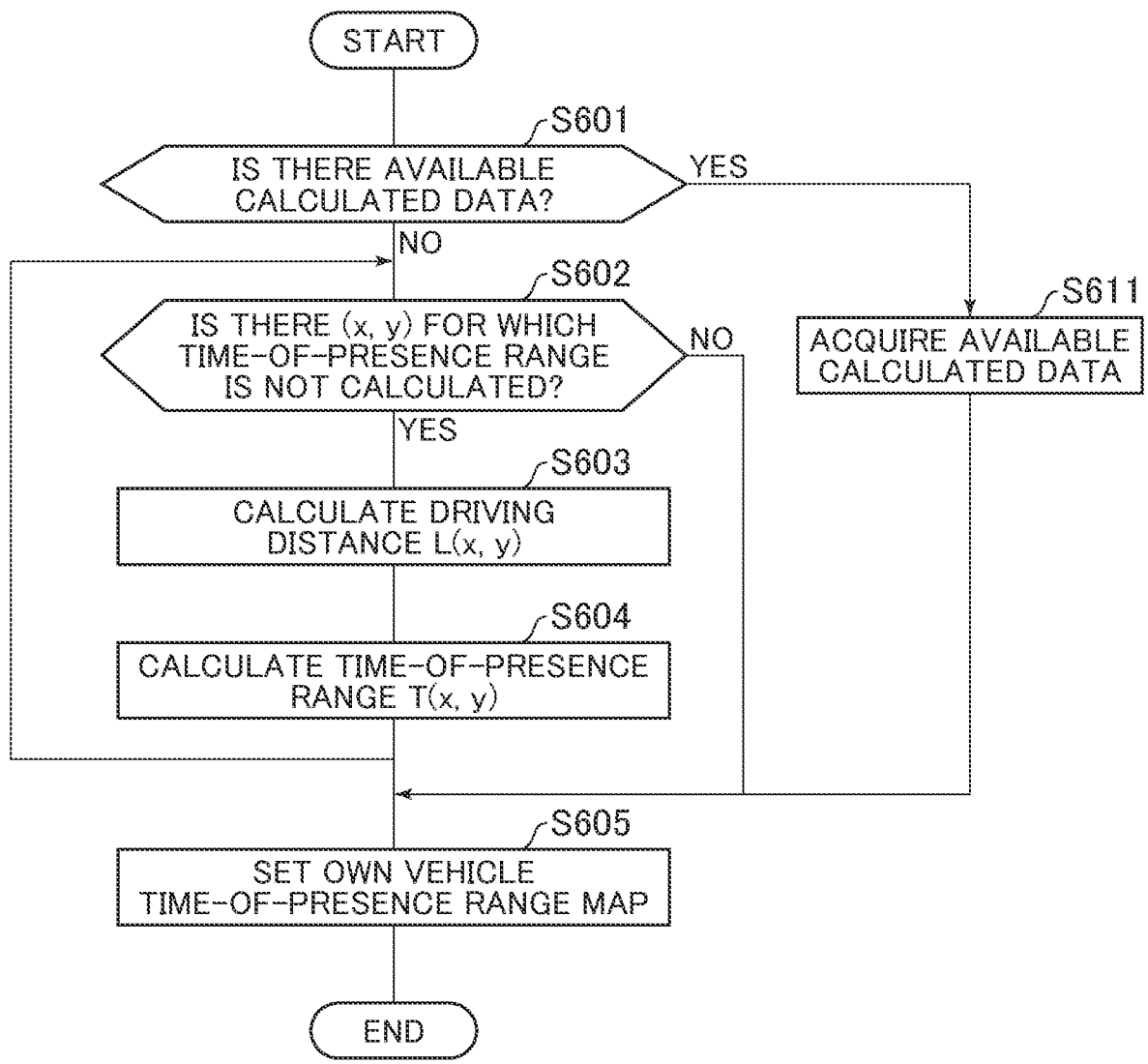
FIG. 6 is a figure showing one example of a flowchart of an own vehicle time-of-presence range determination process.

Next, the own vehicle time-of-presence range determination process 600 executed at Step S505 in FIG. 5 is explained. FIG. 6 is a figure showing one example of a flowchart of the own vehicle time-of-presence range determination process 600.

First, at Step S601, the time-of-presence range determining unit 104 refers to the time-of-presence range data group 123 and checks whether there is available calculated data related to an own vehicle time-of-presence range map. As mentioned below, an own vehicle time-of-presence range map is calculated according to the speed, acceleration and the like of the vehicle 2 based on a predetermined control model. Because of this, if there are not much changes in the speed and/or acceleration of the vehicle 2 since the last time of processing, an own vehicle time-of-presence range map that was determined in the last time of calculation may be used. In addition, it is also possible to reduce the amount of calculation for creating own vehicle time-of-presence range maps by calculating and retaining in advance several patterns of own vehicle time-of-presence range maps according to speeds and/or acceleration, and using them. If a result of judgement at Step S601 shows that there is available calculated data, the data is acquired at Step S611, and then the process proceeds to Step S605. On the other hand, if there is not available calculated data, the process makes a transition to processes at and after Step S602 for creating an own vehicle time-of-presence range map.

At Step S602, the time-of-presence range determining unit 104 judges whether or not there is a position for which a time-of-presence range of the vehicle 2 is not calculated in a predetermined region around the vehicle 2 like the one exemplified in FIG. 2. If a result shows that there is a position for which a time-of-presence range is not calculated, a driving distance L(x, y) required for the vehicle 2 to arrive at the position is calculated (Step S603), and then based on the calculated driving distance L(x, y), a time-of-presence range T(x, y) of the vehicle 2 at the position is calculated considering the vehicle speed, acceleration, jerk and the like of the vehicle 2 (Step S604). After the process of the Step S604 is executed, the process returns to Step S602, and the abovementioned processes are repeated. Thereby, a time-of-presence range T(x, y) of the vehicle 2 is calculated for each cell in the own vehicle time-of-presence range map.

If calculation of time-of-presence ranges of the vehicle 2 in all the cells in Steps S602 to S604 ends, the time-of-presence range determining unit 104 sets, at Step S605, the own vehicle time-of-presence range map in the time-of-presence range data group 123 based on the result of the calculation. On the other hand, if calculated data related to an own vehicle time-of-presence range map is acquired at Step S611, the time-of-presence range determining unit 104 sets, at Step S605, the own vehicle time-of-presence range map in the time-of-presence range data group 123 based on the acquired calculated data. After the process of Step S605 is executed, the time-of-presence range determining unit 104 ends the own vehicle time-of-presence range determination process 600.

It should be noted that a driving distance L(x, y) calculated at Step S603 is a distance corresponding to a distance that should be travelled by the vehicle 2 from the origin (current position) in an own vehicle time-of-presence range map in order to arrive at the position of a coordinate value (x, y). For example, in FIG. 2, one example of the trajectories for arriving at two points, (x1, y1) and (x2, y2), are represented by dashed lines 231, 232 in FIG. 2, respectively. These are determined in accordance with a trajectory model used in driving trajectory planning of the driving control apparatus 70. The trajectories indicated by the dashed lines 231, 232 may be, for example, sectorial arcs having their centers on the y-axis 221 and passing through the origin, and the point (x1, y1) and the point (x2, y2), respectively, spline curves passing through the origin, and the point (x1, y1) and the point (x2, y2), respectively, and whose tangents that pass through the origin coincide with the x-axis 220, or the like. For example, if a sectorial arc model is used, a driving distance L(x, y) is represented by the product of the radius r(x, y) of a sector and the central angle θ(x, y) of the sector. It should be noted that values of the radius r(x, y) and central angle θ(x, y) for a coordinate value (x, y) can be calculated using the following Formulae (1) and (2), respectively.

$$r(x,y)=(x^2+y^2)/2y \quad (1)$$

$$\theta(x,y)=\arctan(x/(r-y)) \quad (2)$$

Figure 7:
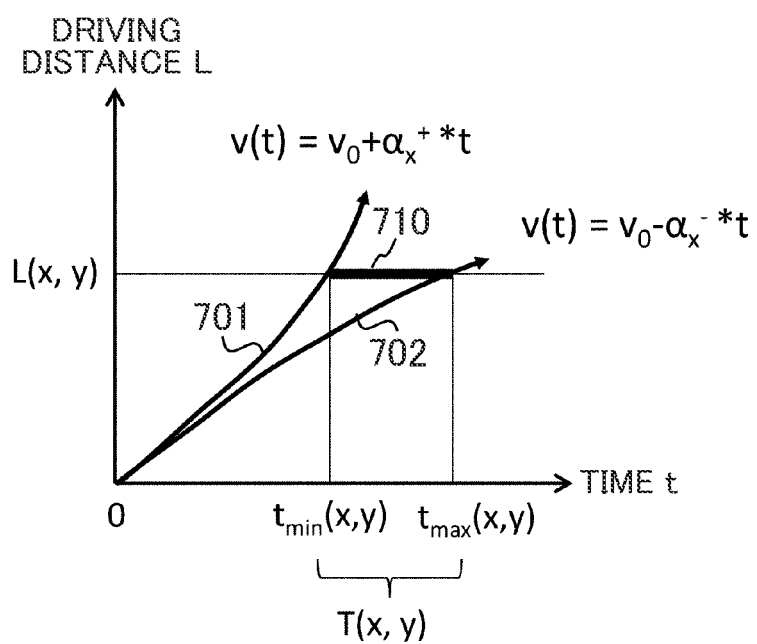
FIG. 7 is a figure showing one example of a manner of calculating an own vehicle time-of-presence range.

At Step S604 in FIG. 6, the time-of-presence range determining unit 104 for example calculates the distribution of time of arrival of the vehicle 2 for the abovementioned driving distance L(x, y) to thereby calculate a time-of-presence range T(x, y) of the vehicle 2. FIG. 7 shows one example of calculation of the distribution of time of arrival of the vehicle 2 for driving distance L(x, y). In FIG. 7, a time range 710 between the shortest time $t_{min}$(x, y) required for the vehicle 2 to arrive at the position of a coordinate value (x, y) and the longest time $t_{max}$(x, y) required for the vehicle 2 to arrive at the position of the coordinate value (x, y) is shown as a time-of-presence range T(x, y) of the vehicle 2. Assuming that the maximum longitudinal acceleration of the vehicle 2 is $\alpha x^+$ (at the time of acceleration) and $\alpha x^-$ (at the time of deceleration), the time range 710 corresponds to the range of a driving distance L(x, y) enclosed by a curve 701 for the maximum acceleration and a curve 702 for the maximum deceleration on the graph of FIG. 7. According to this manner, a time-of-presence range T(x, y) of the vehicle 2 can be determined considering acceleration/deceleration of the vehicle 2.

It should be noted that a time-of-presence range T(x, y) of the vehicle 2 calculated in the abovementioned method corresponds to a uniform probability distribution, but does not reflect at what probability the vehicle 2 can be at the position of a coordinate value (x, y) at a time t. In view of this, as in the time probability distributions 201, 202 shown in FIG. 2, a probability density function p(t) of the vehicle 2 for each position of coordinate values (x, y) may be determined, and used as a time-of-presence range T(x, y) of the vehicle 2. For example, based on a model used in driving trajectory planning of the driving control apparatus 70 and/or the current state of the vehicle 2 (vehicle speed, acceleration, etc.), a plurality of trajectory patterns are constructed, and the distribution of time of arrival of each trajectory pattern is statistically calculated to thereby determine an approximate solution of a probability density function p(t) for each coordinate value (x, y). In this manner also, a time-of-presence range T(x, y) of the vehicle 2 can be calculated.

Alternatively, a time-of-presence range T(x, y) may be represented not as time with a certain range, but as a representative point. Examples of the representative point that can be used include the mode $t_{mode}$, minimum value $t_{min}$, maximum value $t_{max}$, median or the like of a probability density function p(t) determined for each coordinate value (x, y), as explained in FIG. 2. In addition, the representative point of a time-of-presence range T(x, y) of the vehicle 2 may be determined not from a probability density function p(t), but from the current driving state of the vehicle 2, the traffic rules of the road on which the vehicle 2 is driving, or the like. For example, considering the minimum speed and/or maximum speed according to traffic laws, time required for the vehicle 2 to arrive at each position assuming that the vehicle 2 drives at a constant speed or at constant acceleration can be determined, and used as a representative point of a time-of-presence range T(x, y) of the vehicle 2. Furthermore, trajectory planning information determined in the last processing cycle may be acquired from the driving control apparatus 70, and based on this and contents of speed control currently being executed, time required for the vehicle 2 to arrive at each position may be estimated to thereby determine a time-of-presence range T(x, y) of the vehicle 2.

It should be noted that the surrounding environment factor information may be used in determining a time-of-presence range T(x, y) of the vehicle 2. For example, it is possible to reduce a calculation amount by, based on the surrounding environment factor information, identifying regions where the vehicle 2 can drive (hereinafter, referred to as drivable regions), and calculating time-of-presence ranges T(x, y) of the vehicle 2 only for cells that correspond to the drivable regions and areas near the boundaries. In addition, using information about drivable regions, road geometries and the like, it is also possible to correct driving distances L(x, y) into values reflecting actual conditions more.

In the process flow of FIG. 6, a driving distance L(x, y) of the vehicle 2 is calculated at Step S603, and then a time-of-presence range T(x, y) is determined at Step S604. However, there are actually multiple possible trajectories that the vehicle 2 can follow before it arrives at each position of coordinate values (x, y), and the values of the driving distances L(x, y) vary depending on trajectories. In view of this, it is also possible to calculate simultaneously a driving distance L(x, y) and time-of-presence range T(x, y) of the vehicle 2 for each trajectory that is conceivable based on a trajectory model determined from driving trajectory planning, and calculate the distribution of time-of-presence ranges.

<Environment Factor Time-of-Presence Range Determination Process 700 (S506)>

Figure 8:
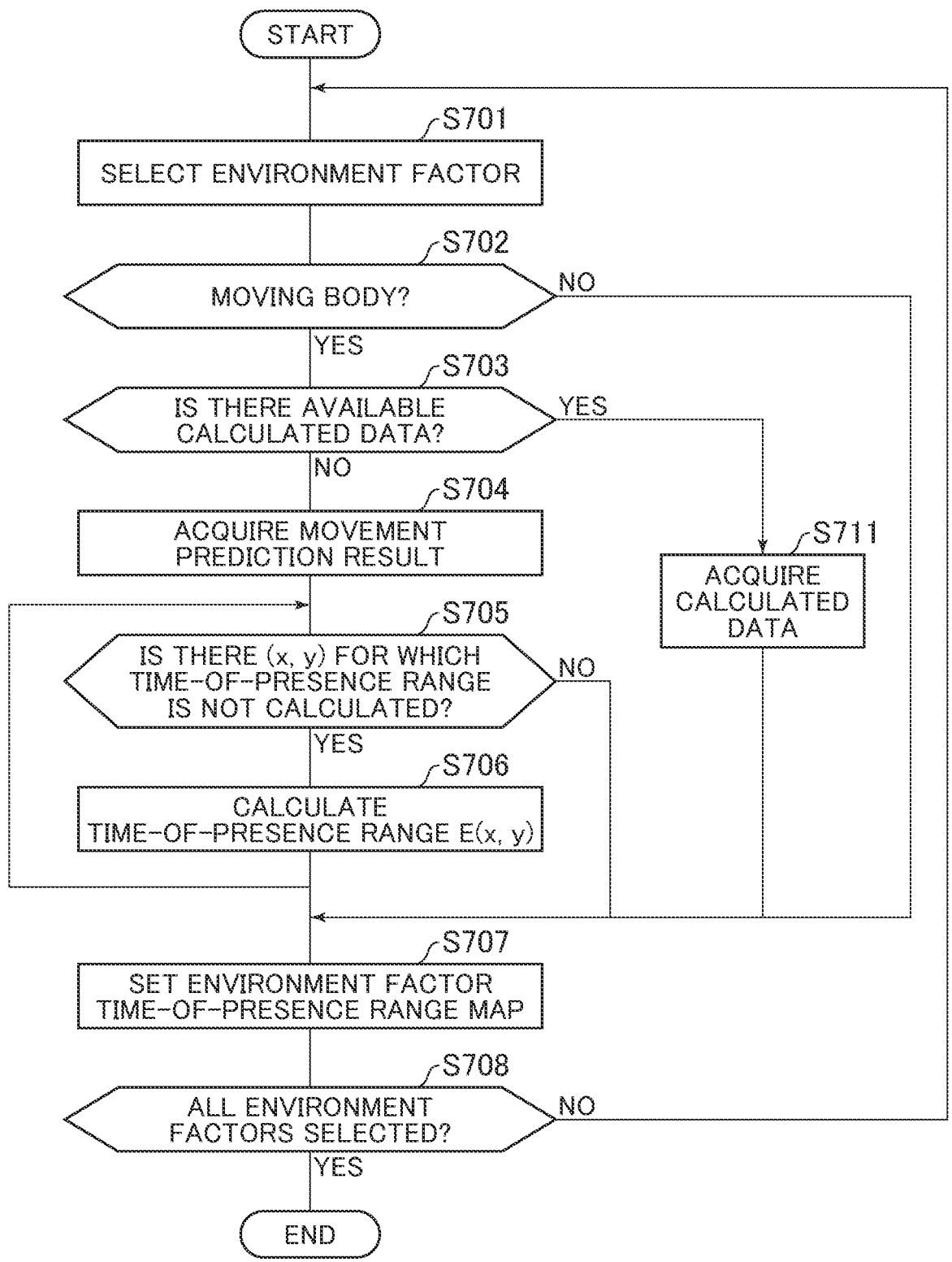
FIG. 8 is a figure showing one example of a flowchart of an environment factor time-of-presence range determination process.

Next, the environment factor time-of-presence range determination process 700 executed at Step S506 in FIG. 5 is explained. FIG. 8 is a figure showing one example of a flowchart of the environment factor time-of-presence range determination process 700.

First, at Step S701, the time-of-presence range determining unit 104 refers to the surrounding environment factor information data group 122 and selects one of environment factors that are around the vehicle 2.

Next, at Step S702, the time-of-presence range determining unit 104 judges whether or not the environment factor selected at Step S701 is a moving body such as another vehicle, a bicycle or a pedestrian. If a result of the judgment shows that the environment factor is a moving body, the process proceeds to Step S703, and if the result shows that the environment factor is not a moving body, the process proceeds to Step S707.

If it is judged at Step S702 that the environment factor is a moving body, the time-of-presence range determining unit 104 refers, at Step S703, to the time-of-presence range data group 123, and checks whether there is available calculated data related to an environment factor time-of-presence range map of the environment factor. For example, if there are not many changes in motion of the environment factor since the last time of processing, an environment factor time-of-presence range map that was determined in the last time of calculation may be used. In addition, it is also possible to reduce the amount of calculation for creating environment factor time-of-presence range maps by calculating and retaining in advance several patterns of time-of-presence range maps for each motion and type of environment factors, and using them. If a result of judgement at Step S703 shows that there is available calculated data, the data is acquired at Step S711, and then the process proceeds to Step S707. On the other hand, if there is not available calculated data, the process makes a transition to processes at and after Step S704 for creating an environment factor time-of-presence range map.

At Step S704, the time-of-presence range determining unit 104 refers to the surrounding environment factor information data group 122, and acquires information indicating a result of prediction about movement of the environment factor selected at Step S701.

Next, at Step S705, the time-of-presence range determining unit 104 judges whether or not there is a position for which a time-of-presence range of the environment factor selected at Step S701 is not calculated in a predetermined region around the vehicle 2 exemplified in FIG. 2. If a result of the judgment shows that there is a position for which a time-of-presence range is not calculated, a time-of-presence range E(x, y) of the environment factor for the position is calculated based on the result of prediction about movement of the environment factor acquired at Step S704 (Step S706). After the process of the Step S706 is executed, the process returns to Step S705, and the abovementioned processes are repeated. Thereby, a time-of-presence range E(x, y) of the environment factor is calculated for each cell of the environment factor time-of-presence range map.

If calculation of time-of-presence ranges of the environment factors in all the cells in Steps S705 to S706 ends, the time-of-presence range determining unit 104 sets, at Step S707, the environment factor time-of-presence range map in the time-of-presence range data group 123 based on the result of the calculation. On the other hand, if calculated data related to an environment factor time-of-presence range map is acquired at Step S711, the time-of-presence range determining unit 104 sets, at Step S707, the environment factor time-of-presence range map in the time-of-presence range data group 123 based on the acquired calculated data. In addition, if it is judged at Step S702 that the environment factor is not a moving body, the time-of-presence range determining unit 104 sets, at Step S707, an environment factor time-of-presence range map indicating the position of the environment factor in the time-of-presence range data group 123.

Next, at Step S708, the time-of-presence range determining unit 104 judges whether or not all the environment factors that are around the vehicle 2 are selected at Step S701. If there are unselected environment factors, the process returns to Step S701, and after any one environment factor among them is selected at Step S701, the abovementioned processes at and after Step S702 are performed on the environment factor. On the other hand, if all the environment factors are selected, the time-of-presence range determining unit 104 ends the environment factor time-of-presence range determination process 700.

It should be noted that although here at Steps S705, S706, time-of-presence ranges for all the coordinates (x, y) are calculated about each environment factor, time-of-presence ranges for a limited range of positions may also be calculated since a result of prediction about movement of each environment factor would show such a limited range where the environment factor can be.

With the own vehicle time-of-presence range determination process 600 and environment factor time-of-presence range determination process 700 explained above, the own vehicle time-of-presence range map representing the time-of-presence range of the vehicle 2 for each position around the current position of the vehicle 2 and the environment factor time-of-presence range map representing the time-of-presence range of each environment factor for each position around the current position of the vehicle 2 are determined individually.

<Risk-of-Driving Map Creation Process 800 (S507)>

Figure 9:
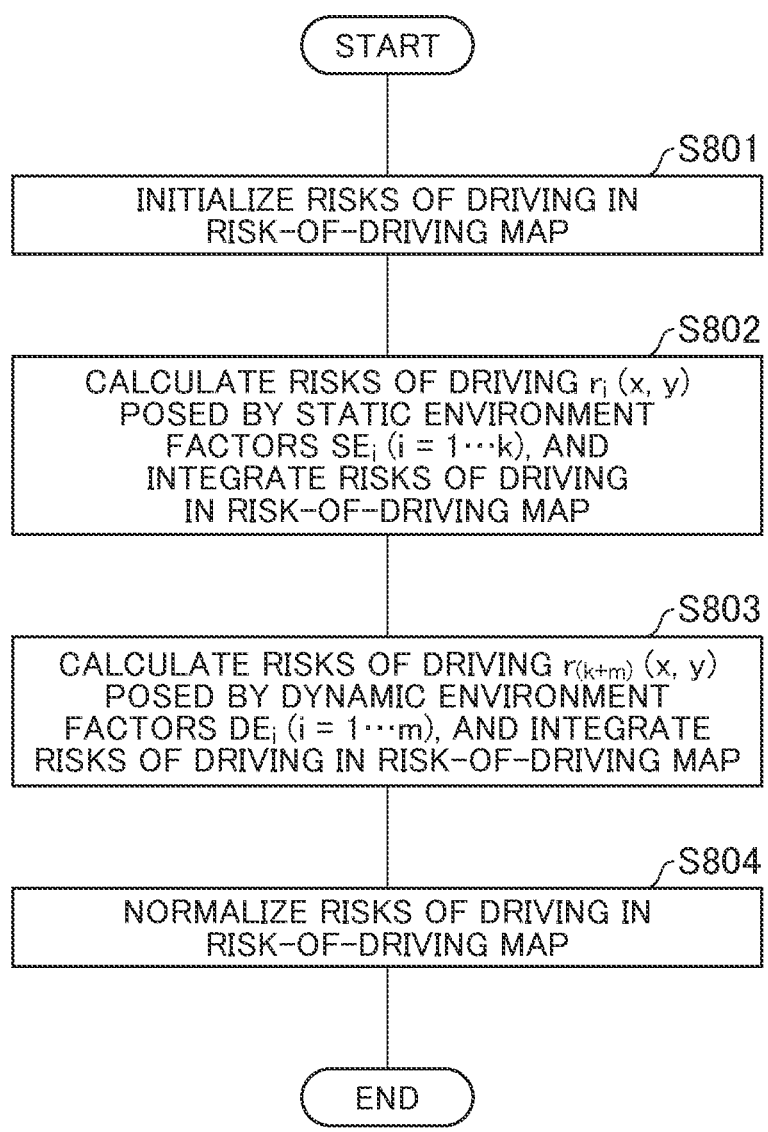
FIG. 9 is a figure showing one example of a flowchart a risk-of-driving map creation process.

Next, the risk-of-driving map creation process 800 executed at Step S507 in FIG. 5 is explained. FIG. 9 is a figure showing one example of the flowchart of the risk-of-driving map creation process 800.

First, at Step S801, the risk-of-driving map creating unit 106 initializes risks of driving in a risk-of-driving map stored in the risk-of-driving map data group 124. Specifically, in preparation for integration of the risks of driving at and after Step S802 to be explained below, predetermined initial values, for example the minimum values of risk, for all the cells in the risk-of-driving map exemplified in FIG. 3 are set.

Then, at Steps S802, S803, the risk-of-driving map creating unit 106 calculates the risks of driving posed by static environment factors (SE's) and dynamic environment factors (DE's), individually, and integrates them in the risk-of-driving map. Here, the time-of-presence range map of the vehicle 2 that is created through the own vehicle time-of-presence range determination process 600 executed at Step S505 in FIG. 5 and is recorded in the time-of-presence range data group 123 and the time-of-presence range map of each environment factor that is created through the environment factor time-of-presence range determination process 700 executed at Step S506 in FIG. 5 and is recorded in the time-of-presence range data group 123 are used for calculation, by the risk-of-driving determining unit 105, of the risk of driving posed by each environment factor on driving of the vehicle 2. The risk-of-driving map creating unit 106 integrates the thus-calculated risks of driving for individual environment factors for each cell on the risk-of-driving map to thereby determine the risk of driving for each position around the vehicle 2.

Upon completion of integration of the risks of driving for all the environment factors for each cell on the risk-of-driving map at Steps S802 and 803, the risk-of-driving map creating unit 106 normalizes, at Step S804, the value of the integrated risks of driving in each cell. Thereby, the risk-of-driving map is constructed. Upon completion of execution of the process at Step S804, the risk-of-driving map creating unit 106 ends the risk-of-driving map creation process 800.

In the risk-of-driving map created through the risk-of-driving map creation process 800 explained above, a risk of driving R(x, y) at each position of coordinate values (x, y) is a weighted integrated value of a risk posed by each environment factor, and is represented for example by the following Formula (3). Note that in Formula (3), ri and wi (i is an integer in the range from 1 to n) represent a risk of driving and weighting coefficient related to an environment factor respectively.

$$R(x,y)=w1*r1(x,y)+ \ldots +wn*rn(x,y) \quad (3)$$

In the risk-of-driving map creation process 800 shown in FIG. 9, the risk-of-driving determining unit 105 has performed, at Step S802, the integration process on the risks of driving related to k static environment factors, and has performed, at Step S803, the integration process on the risks of driving related to m dynamic environment factors. Static environment factors refer to those whose states will not show changes in a length of time which is the risk-of-driving evaluation target, that is, in time to come necessary for driving trajectory planning (for example, in ten seconds). Static environment factors include, for example, road geometries, lane attributes (whether it is a forward driving lane or an opposite driving lane, etc.), traffic rules, road conditions and the like. It should be noted that environment factors (road conditions, etc.) that might show changes if a long time elapses, but will not show changes in a length of time which is the risk-of-driving evaluation target can be treated as static environment factors. On the other hand, dynamic environment factors refer to those whose states may show changes in a length of time which is a risk-of-driving evaluation target. Dynamic environment factors include moving obstacles such as vehicles or pedestrians, potential risks posed by blind corners, and the like.

Figure 10:
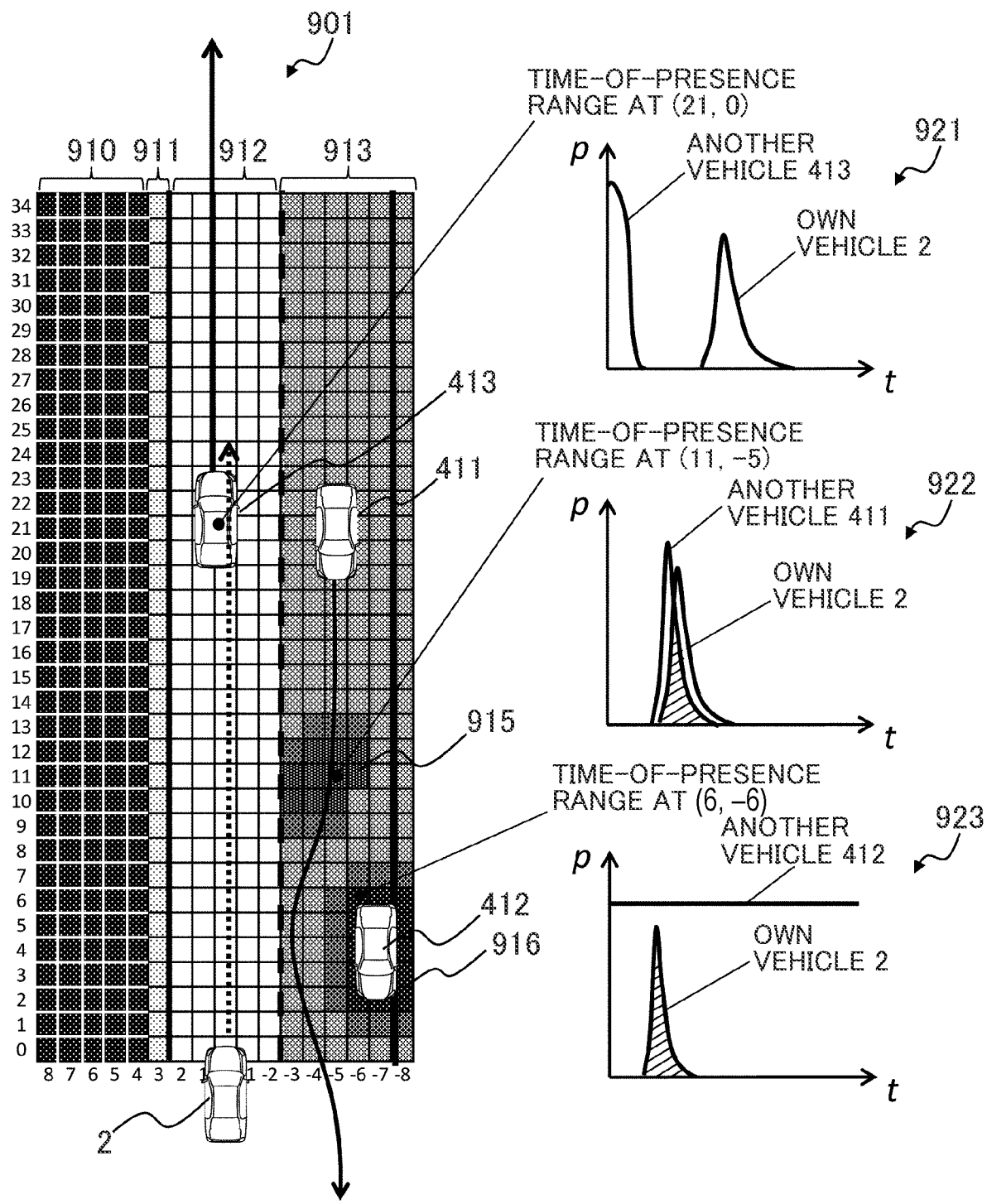
FIG. 10 is a figure showing one example of a result of calculating a risk-of-driving map.
Figure 11:
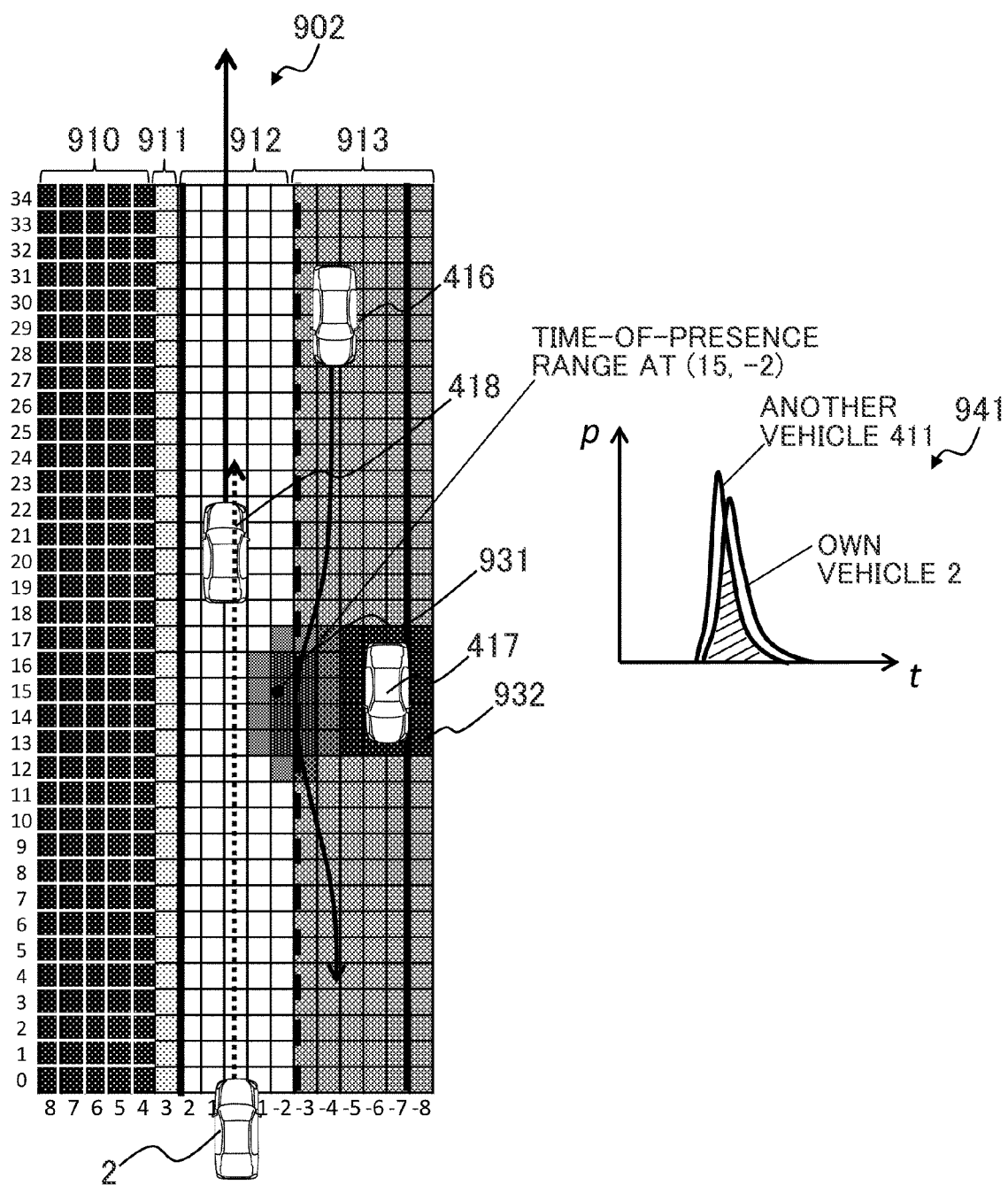
FIG. 11 is a figure showing one example of a result of calculating a risk-of-driving map in another scene.

FIG. 10 and FIG. 11 are figures individually showing examples of results of calculating risk-of-driving maps through the risk-of-driving map creation process 800. A risk-of-driving map 901 in FIG. 10 shows one example of a risk-of-driving map generated in the scene 401 in FIG. 4. A risk-of-driving map 902 in FIG. 11 shows one example of a risk-of-driving map generated in the scene 402 in FIG. 4.

First, calculation of the risks of driving posed by static environment factors at Step S802 is performed by successively integrating the values of the risks of driving posed by individual environment factors in cells of the subject risk-of-driving map according to a predetermined model (corresponding to wi and ri in the abovementioned Calculation Formula (3) about the risks of driving). For example, the risks of driving posed by static environment factors in the risk-of-driving map 901 shown in FIG. 10 are determined by recognizing individually a non-vehicle road region 910, a roadside zone region 911, a driving lane region 912 and an opposite lane region 913 including the roadside zone as attributes of the road that are indicated by static environment factors, and integrating the risks of driving in subject cells according to individual risk-of-driving models. In the risk-of-driving map 901 of FIG. 10, a high risk of driving is set for the non-vehicle road region 910 since the vehicle 2 cannot drive there. In addition, medium risks of driving are set for the roadside zone region 911 and opposite lane region 913 since the vehicle 2 will not basically drive there, but might drive there temporarily in order to pass other vehicles or for other purposes. On the other hand, a low risk of driving is set for the driving lane region 912 since there is no risk for the vehicle 2 to drive there. It should be noted that at this time point, equal risks of driving are assumed to be set for individual positions in the regions 910 to 913 since the risks of driving posed by dynamic environment factors such as moving bodies are not considered yet.

Upon completion of integration of the risks of driving posed by the static environment factors in this manner, integration of the risks of driving posed by dynamic environment factors is performed next at Step S803. The risks of driving posed by the dynamic environment factors are calculated based on relationships between time-of-presence ranges of those environment factors and time-of-presence ranges of the vehicle 2. This means that for each position in the risk-of-driving map, temporal crossing relationships between those environment factors and the vehicles 2 are evaluated, and the risks of driving are calculated. It should be noted that the time-of-presence ranges of the vehicle 2 are created through the own vehicle time-of-presence range determination process 600 executed at Step S505 in FIG. 5, and are represented by the own vehicle time-of-presence range map recorded in the time-of-presence range data group 123. In addition, the time-of-presence ranges of the dynamic environment factors are created through the environment factor time-of-presence range determination process 700 executed at Step S506 in FIG. 5 about each dynamic environment factor, and represented by the environment factor time-of-presence range map recorded in the time-of-presence range data group 123.

FIG. 10 and FIG. 11 show one example in which the risk of driving at each position in a risk-of-driving map is calculated based on the degree of overlap between the probability distribution of the time-of-presence range of the vehicle 2 in the own vehicle time-of-presence range map and the probability distribution of the time-of-presence range of each dynamic environment factor in the environment factor time-of-presence range map. A formula for calculating the risk of driving R(x, y) of the vehicle 2 posed by an environment factor i based on the probability distributions of the time-of-presence ranges is represented for example by the following Formula (4). Note that in Formula (4), $p_{(x, y)}(t)$ represents the probability distribution of the time-of-presence ranges of the vehicle 2, and $p_{i(x, y)}(t)$ represents the probability distribution of the time-of-presence range of an environment factor i.

[Equation 1]

[Equation 1]

$$R(x,y)=w_i \cdot r_i(x,y)=w_i \cdot \int_0^F (p_{(x,y)}(t)-p_{i(x,y)}(t))dt \qquad (4)$$

It should be noted that the risk of driving R(x, y) represented by the abovementioned Formula (4) is similar to that represented by the aforementioned Formula (3), and corresponds to the one obtained by multiplying the risk of driving (probability of collision) ri(x, y) of the vehicle 2 related to the environment factor i with the weighting coefficient wi.

A graph 921 in FIG. 10 represents the probability distributions of time-of-presence ranges of the vehicle 2 and a dynamic environment factor at the coordinate (21, 0) on the risk-of-driving map 901. Since a dynamic environment factor related to this coordinate position corresponds to the other vehicle 413 that is present at the position at a current time point (t=0), the probability distribution of a time-of-presence range of the other vehicle 413 is plotted on the graph 921, in addition to the probability distribution of the time-of-presence range of the vehicle 2. Since the other vehicle 413 is driving at a predetermined speed, and will be away from the position soon, the probability distribution of the time-of-presence range of the other vehicle 413 in the graph 921 exhibits a curve that starts at the probability of 1 and decreases to 0 rapidly. In contrast to this, since the vehicle 2 needs a certain length of time to arrive at the position, the probability distribution of the time-of-presence range of the vehicle 2 appears at a different time zone from the curve for the other vehicle 413. Accordingly, the probability distributions of the time-of-presence ranges of both the vehicles are not overlapping as shown in the graph 921. Thereby, it can be judged that there is no risk of both the vehicles colliding each other, and the risk of driving posed by a dynamic environment factor to be integrated is 0. Because of this, in the risk-of-driving map 901, the value of the risk of driving posed by dynamic environment factors at the coordinate (21, 0) remains at a low value set to the driving lane region 912 for static environment factors.

On the other hand, it can be known as shown in a graph 922 of FIG. 10 that the probability distributions of time-of-presence ranges of the other vehicle 411 and vehicle 2 are overlapping at the coordinate (11, −5). This means that the distribution of time of arrival of the vehicle 2 when driving to the position and the distribution of time of arrival of the other vehicle 411 when moving to the position are overlapping with each other (corresponding to the shaded portion in the graph 922), and the probability of collision between the vehicles is very high. Because of this, in the risk-of-driving map 901, the risk of driving posed by the other vehicle 411 is integrated in the region 915 including the coordinate (11, −5), and the risk of driving in the region 915 is higher than the risks of driving in surrounding regions.

It should be noted that the formula for calculating a risk of driving indicated by Formula (4) can be applied likewise to static environment factors such as stationary objects. Since a stationary object keeps being present at its place, the probability distribution of a time-of-presence range of it is represented as a uniform distribution showing the probability of 1. A graph 923 in FIG. 10 represents the probability distributions of time-of-presence ranges of the vehicle 2 and a static environment factor at the coordinate (6, −6) near the other vehicle 412 parked on the road. The graph 923 shows that the probability of the time-of-presence range of the other vehicle 412 is 1 throughout the probability distribution of the time-of-presence range of the vehicle 2, and there is a risk of collision between both the vehicles. Because of this, in the risk-of-driving map 901, the risk of driving posed by the other vehicle 412 is integrated in a region 916 including the coordinate (6, −6), and the risk of driving in the region 916 is higher than the risks of driving in surrounding regions. Since a stationary object poses a risk of driving with the constant probability of 1 in this manner, such a risk does not have a probabilistic nature, resulting in a predetermined value being integrated according to a predetermined model. This is similar to the abovementioned mechanism of calculating a risk of driving posed by a static environment factor. That is, the formula for calculating a risk of driving indicated by Formula (4) is comprehensibly applicable to all the environment factors, whether static or dynamic.

The risk-of-driving map 901 in FIG. 10 and the risk-of-driving map 902 in FIG. 11 are risk-of-driving maps generated for the scenes 401, 402 in FIG. 4, respectively, according to the abovementioned manner. In the following explanation, the risk-of-driving map 901 in FIG. 10 and the risk-of-driving map 902 in FIG. 11 are compared.

First, attention is paid to the risks of driving posed by the other vehicles 411, 416 that are driving on the opposite lane of the vehicle 2 and pass the other vehicles 412, 417 parked on the road, respectively. The risk-of-driving map 901 represents, in the opposite lane region 913, the region 915 where the risk of driving is high corresponding to the other vehicle 411. It should be noted that a high risk of driving is set also to the region 916 corresponding to the parked other vehicle 412. On the other hand, the risk-of-driving map 902 represents, in the driving lane region 912, part of a region 931 where the risk of driving is high corresponding to the other vehicle 416. It should be noted that a high risk of driving is set also to the region 932 corresponding to the parked other vehicle 417. Such a difference arises from a relationship between the timing at which the other vehicles 411, 416 avoid the other vehicles 412, 417, respectively, and cross into the driving lane of the vehicle 2 and the timing at which the vehicle 2 passes by the other vehicles 411, 416 individually. That is, in the scene 401, since the vehicle 2 passes by the other vehicle 411 before the other vehicle 411 tries to avoid the parked other vehicle 412, the risk of the vehicle 2 and other vehicle 411 colliding each other on the driving lane is low. Because of this, the region 915 where the risk of driving is high is not present in the driving lane region 912 in the risk-of-driving map 901. On the other hand, in the scene 402, since the timing at which the other vehicle 416 avoids the parked other vehicle 417 coincides with the timing at which the vehicle 2 passes by the other vehicle 416, the risk of the vehicle 2 and other vehicle 411 colliding each other on the driving lane is high. Because of this, the region 931 where the risk of driving is high crosses into the driving lane region 912 in the risk-of-driving map 902.

Next, attention is paid to the risks of driving posed by the other vehicles 413, 418 driving ahead of the vehicle 2. In both the risk-of-driving maps 901, 902, the risks of driving corresponding to the other vehicles 413, 418 do not appear. This is because the other vehicles 413, 418, and the vehicle 2 are driving at equal speeds, respectively, so they will not cross at a single place at a time point in the immediately following time points. It should be noted that although not exemplified here, if the distances between the vehicle 2 and the other vehicles 413, 418 are not sufficient or the speeds of the other vehicles 413, 418 are slower than the speed of the vehicle 2, it becomes possible that both the vehicles cross at a certain time point in the immediately following time points. Because of this, in such a case, in the risk-of-driving maps 901, 902, high risks of driving appear at the corresponding places. This matches how humans comprehend circumstances.

If driving trajectory planning is performed based on the abovementioned risk-of-driving maps 901, 902, in the scene 401, the planned driving trajectory will be one in which the vehicle 2 remains on and follows the lane center line since a high risk of driving does not appear on the driving lane of the vehicle 2 in the risk-of-driving map 901. On the other hand, in the scene 402, since a high risk of driving appears on the driving lane of the vehicle 2 in the risk-of-driving map 902, it is expected that a planned driving trajectory becomes closer to a roadside zone side, for example, such that the vehicle 2 avoids the place of the high risk of driving. Accordingly, driving trajectories matching the behavior that humans will show in those individual scenes naturally can be obtained. That is, if a parked vehicle is recognized on the opposite lane, the own vehicle can be automatically caused to steer away to a roadside zone side in accordance with timing of the other vehicle driving ahead on the opposite lane such that the other vehicle can avoid the parked vehicle as necessary.

Figure 12:
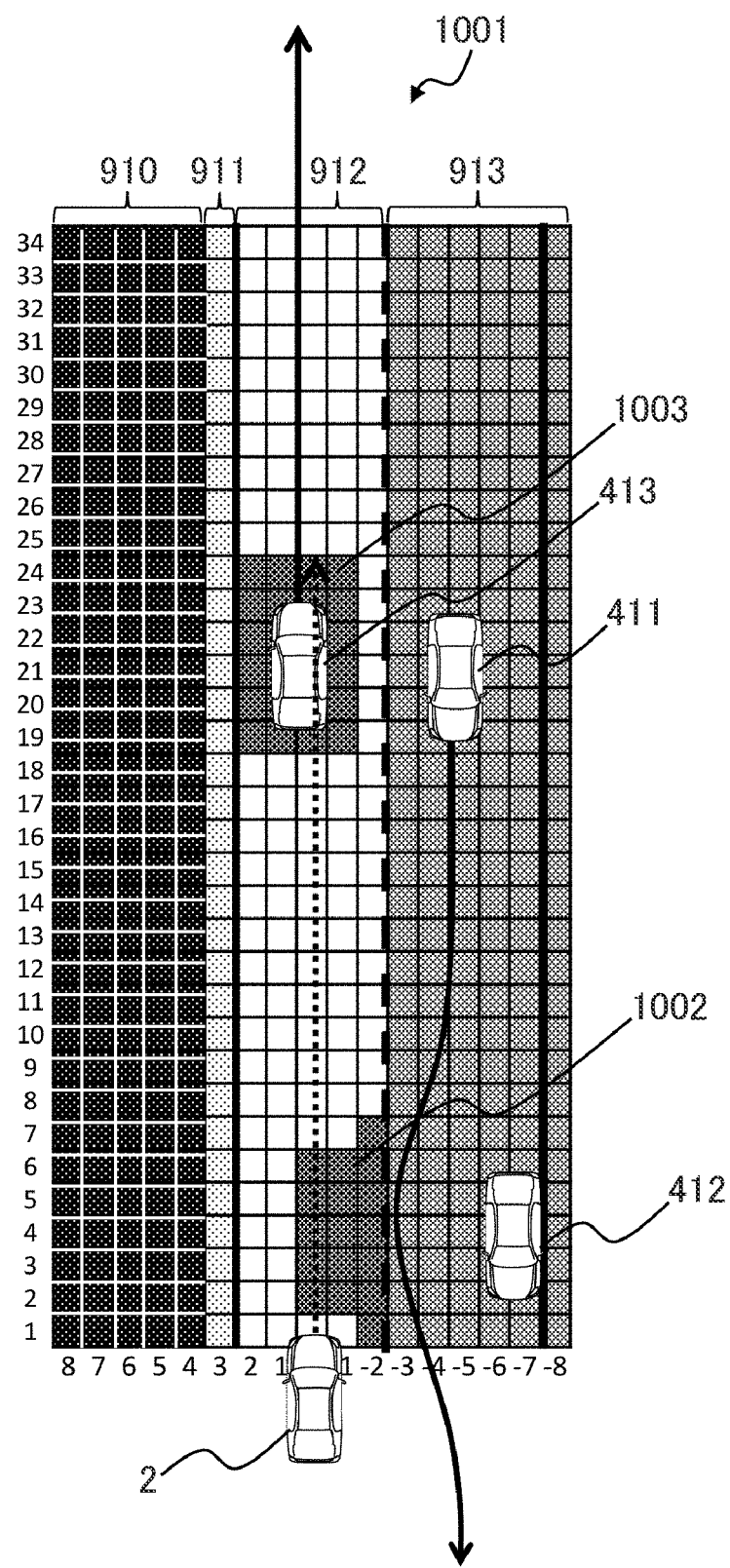
FIG. 12 is a figure showing an example of a risk-of-driving map according to a conventional manner.

Here, a risk-of-driving map according to a conventional technique is explained. FIG. 12 is a figure showing, as a risk-of-driving map according to a conventional technique, an example of a risk-of-driving map that is obtained by evaluating risks based on the degrees of spatial overlap between predicted driving trajectories of individual vehicles. It should be noted that a risk-of-driving map 1001 in FIG. 12 shows one example of a risk-of-driving map generated in the scene 401 in FIG. 4, like the risk-of-driving map 901 shown in FIG. 10.

In the risk-of-driving map 1001, the risks of driving are high in regions 1002, 1003 which are portions where the predicted driving trajectories of the other vehicles 411, 413 and the predicted driving trajectory of the vehicle 2 overlap. However, since time points at which the vehicle 2 and other vehicles 411, 413 individually pass through the regions 1002, 1003 are different on the time axis, it is not possible for the vehicle 2 and the other vehicle 411, 413 to cross each other at places of the regions 1002, 1003. That is, this means that the risks of driving in the regions 1002, 1003 are incorrectly set high in the risk-of-driving map 1001. This is attributable to the fact that since in the conventional technique, the time axis is fixed, and a risk is evaluated based on an overlap between spatial ranges where the vehicle 2 and each environment factor are individually present, it is impossible to correctly evaluate crossing relationships on the time axis. Accordingly, if the risk-of-driving map 1001 is used to perform driving trajectory planning for the vehicle 2, a driving trajectory to be drawn might be one to avoid the regions 1002, 1003. In that case, the vehicle 2 runs in an unnecessarily zigzag manner, users of the vehicle 2 are given senses of insecurity and/or discomfort.

On the other hand, since according to the present embodiment, a risk is evaluated based on an overlap between time-of-presence ranges of the vehicle 2 and each environment factor for each position in the aforementioned manner, crossing relationships on the time axis can be evaluated correctly. Accordingly, as explained with reference to FIG. 10 and/or FIG. 11, the risk of driving of the vehicle 2 can be calculated highly precisely in a manner reflecting actual conditions.

In addition, another feature of the present embodiment is that the driving trajectory of the own vehicle is not used as a premise. That is, in the surrounding environment recognition process 500, at Steps S505, S506 in FIG. 5, a driving trajectory of the vehicle 2 is not used as a premise, but the time-of-presence range of the vehicle 2 is determined for any position in a predetermined range around the vehicle 2. Because of this, it is possible to calculate the risks of driving for all the positions on a risk-of-driving map. Actually, in the risk-of-driving map 901 in FIG. 10 and/or the risk-of-driving map 902 in FIG. 11, risks of driving in regions on the opposite lane region 913 where the vehicle 2 does not drive normally like the regions 915, 916 and/or region 932 for example are also represented. In contrast, in conventional techniques in which risks are evaluated based on the degrees of overlap of predicted driving trajectories of individual vehicles in a space, the risk of driving is evaluated for a predicted driving trajectory of the vehicle 2. Because of this, evaluation of the risk of driving is not performed for regions out of the range of the predicted driving trajectory, especially about dynamic environment factors. For example, in the risk-of-driving map 1001 exemplified in FIG. 12, the risks of driving posed by the other vehicles 411, 412 do not appear in the opposite lane region 913. This means that it is not possible to judge whether it is good or bad for the vehicle 2 to deviate from the range of the predicted driving trajectory in driving trajectory planning using the risk-of-driving map 1001. For example, even in the case where it becomes necessary for the vehicle 2 to pass another vehicle driving ahead by crossing into the opposite lane in haste, the vehicle 2 cannot evaluate the risk of driving and perform such operation if such a predicted driving trajectory is not obtained in advance. On the other hand, since according to the present embodiment, the risks of driving are uniformly evaluated for all the regions on the risk-of-driving map, the vehicle 2 can cope with every possible driving trajectory even if driving trajectories are not predicted in advance.

It should be noted that although an example of calculating risks of driving using probability distributions as time-of-presence ranges is explained with reference to FIG. 10 and FIG. 11, another manner of calculation may also be used. In the following explanation, an example of using a manner of calculation other than probability distributions is explained.

Figure 13:
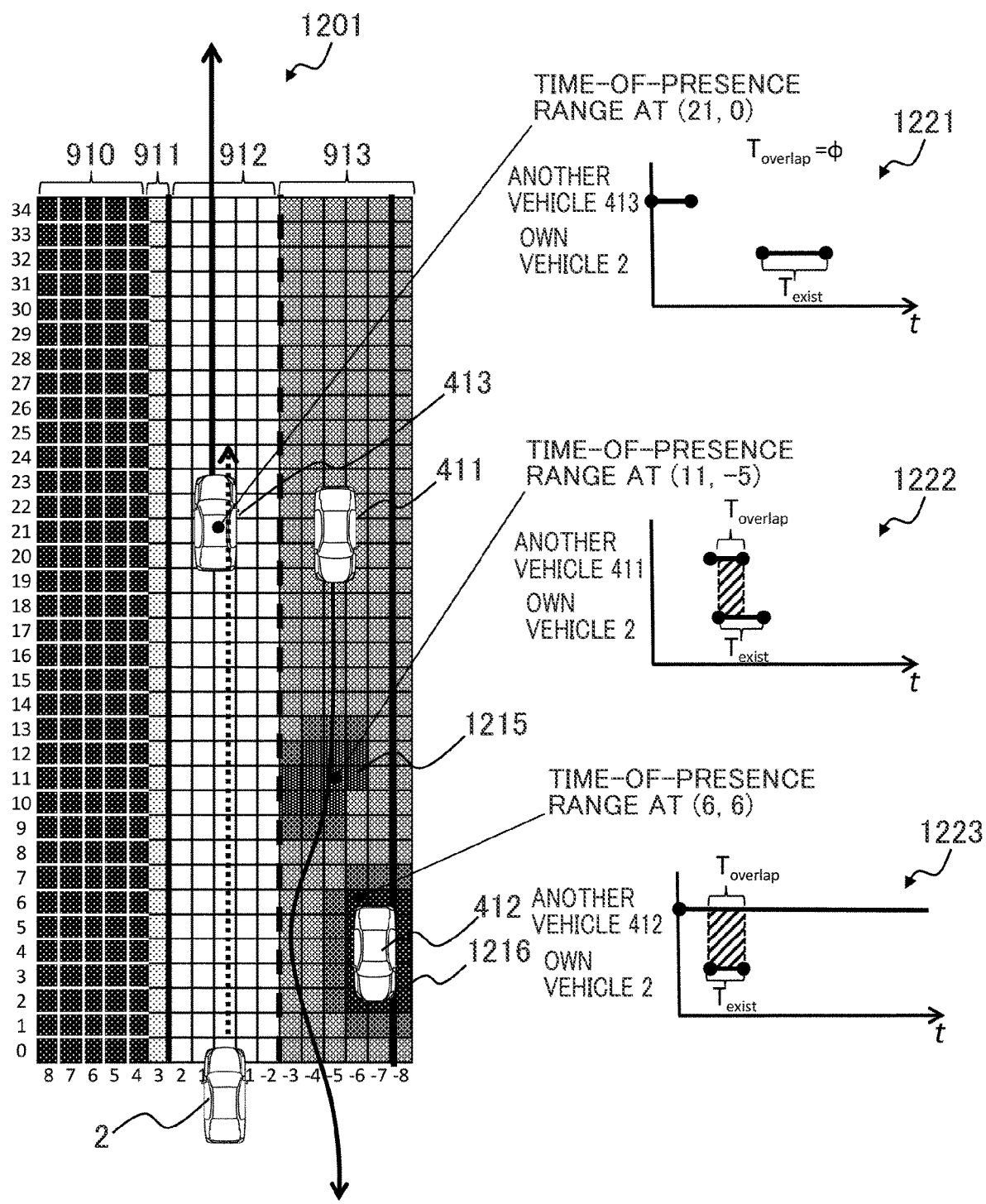
FIG. 13 is a figure showing an example of a risk-of-driving map according to the present invention.

FIG. 13 is a figure showing an example of a risk-of-driving map according to the present invention in the case where time-of-presence ranges of the vehicle 2 and each environment factor are represented in time zones. It should be noted that a risk-of-driving map 1201 in FIG. 13 shows one example of a risk-of-driving map generated in the scene 401 in FIG. 4, like the risk-of-driving map 901 shown in FIG. 10.

In the risk-of-driving map 1201 in FIG. 13, the risk of driving is evaluated based on an overlap between time zones individually representing time-of-presence ranges of the vehicle 2 and each environment factor. A formula for calculating the risk of driving R(x, y) of the vehicle 2 posed by an environment factor i using an overlap between time zones in such a manner is represented for example by the following Formula (5). Note that in Formula (5), $T_{exist}$ indicates the length of the time-of-presence range of the vehicle 2, and this corresponds to the difference between $t^{(1)}_{max}$ and $t^{(1)}_{min}$ in the graph 211 in FIG. 2 and the difference between $t^{(2)}_{max}$ and $t^{(2)}_{min}$ in the graph 212 in FIG. 2 In addition, $T_{overlap}$ indicates the length of time in which the time-of-presence ranges of the vehicle 2 and each environment factor are overlapping.

[Equation 2]

[Equation 2]

$$R(x, y) = w_i \cdot r_i(x, y) = w_i \cdot \frac{T_{overlap}}{T_{exist}} \quad (5)$$

It should be noted that the risk of driving R(x, y) represented by the abovementioned Formula (5) is similar to the aforementioned Formula (3), and corresponds to one obtained by approximating the probability distribution p(x, y)(t) of the time-of-presence range of the vehicle 2 and the probability distribution pi(x, y)(t) of the time-of-presence range of an environment factor i as a uniform distribution in Formula (4).

A graph 1221 in FIG. 13 represents the times zones of time-of-presence ranges of the vehicle 2 and a dynamic environment factor at the coordinate (21, 0) on the risk-of-driving map 1201. The other vehicle 413 present at this coordinate position at a current time point (t=0) corresponds to a dynamic environment factor related to this position. Since the time zone in which the vehicle 2 is present does not overlap the time zone in which the other vehicle 413 is present in the graph 1221, the risk of driving posed by a dynamic environment factor to be integrated is 0. Accordingly, in the risk-of-driving map 1201, the value of the risk of driving posed by dynamic environment factors at the coordinate (21, 0) remains at a low value set to the driving lane region 912 for static environment factors.

On the other hand, as indicated in the graph 1222 in FIG. 13, at the coordinate (11, −5), the time zone in which the other vehicle 411 is present and the time zone in which the vehicle 2 is present overlap each other in the shaded portion. Because of this, in the risk-of-driving map 1201, the risk of driving posed by the other vehicle 411 is integrated in the region 1215 including the coordinate (11, −5), and the risk of driving in the region 1215 is higher than the risks of driving in surrounding regions. In addition, in the graph 1223, the other vehicle 412 is present in the entire time zone, and as shown in the shaded portion, there is an overlap with the time zone in which the vehicle 2 is present. Because of this, in the risk-of-driving map 1201, the risk of driving posed by the other vehicle 412, which is a stationary object, is integrated in a region 1216 including the coordinate (6, −6), and the risk of driving in the region 1216 is higher than the risks of driving in surrounding regions.

Alternatively, in still another manner of calculating risks of driving, for example, representative points and/or representative values representing features of probability distributions or time zones representing time-of-presence ranges of the vehicle 2 and each environment factor may also be used to evaluate risks of driving. Representative points or representative values to be used may be the modes, medians, minimum values, maximum values or the like of probability distributions or time zones representing time-of-presence ranges of the vehicle 2 and each environment factor, for example. Alternatively, parameters characterizing probability distributions and/or time zones representing time-of-presence ranges of the vehicle 2 and each environment factor may be used as representative points and/or representative values. For example, time of arrival assuming that the vehicle 2 and each environment factor are driving at constant speeds, time of arrival assuming that the vehicle 2 and each environment factor are driving at constant, time of arrival estimated based on trajectory planning information determined in the last processing cycle, or the like may be used as representative points or representative values.

A formula for calculating the risk of driving $R(x, y)$ of the vehicle 2 posed by an environment factor i in the case where representative points and/or representative values are used is represented for example by the following Formula (6). Note that in Formula (6), $T_{repre}$ indicates a representative value of the time-of-presence range of the vehicle 2, and $T^{(i)}_{repre}$ indicates a representative value of the time-of-presence range of an environment factor i.

[Equation 3]

[Equation 3]

$$R(x,y)=w_i \cdot r_i(x,y)=w_i \cdot f(|T_{repre}-T_{repre}^{(i)}|) \qquad (6)$$

The abovementioned Formula (6) evaluates a risk of driving according to a function $f(x)$ based on the absolute value of the difference between the representative value $T_{repre}$ of the time-of-presence range of the vehicle 2 and the representative value $T^{(i)}_{repre}$ of the time-of-presence range of an environment factor i. In the function $f(x)$, the larger x is, the smaller the value of the function $f(x)$ is, and for example can be represented by a formula such as $f(x)=a \cdot \exp(-bx^2)$ using correction factors a, b.

In Formula (6), the magnitude of and/or the extent of attenuation of the value of the function $f(x)$ may also be adjusted using for example the abovementioned correction factors a, b according to the representative value $T_{repre}$ of the time-of-presence range of the vehicle 2 and/or the vehicle speed of the vehicle 2. In addition, a predetermined distribution (such as a Gaussian distribution) centered on a representative value may also be used to approximate the probability distribution of the time-of-presence range of the vehicle 2 or each environment factor to calculate the risk of driving according to an overlap therebetween.

Alternatively, a risk of driving may also be evaluated based on the summation of time-of-presence ranges of all the environment factors instead of evaluating risks of driving of time-of-presence ranges of the individual environment factors i. In this case, for example, by placing, as $T_{free}$, a time range in which environment factors are not present in the summation of the time-of-presence ranges of all the environment factors i, it may be evaluated how much margin can be allocated at most for the own vehicle in $T_{free}$ using ($T_{mergin}$). For example, if at a certain coordinate (x, y), $T_{free}$ is [1 s to 3 s], and the own vehicle time-of-presence range is [1.5 s to 1.8 s], the largest margin can be allocated at 1.8 s, and $T_{mergin}$=0.8 s. This indicates how much possibility there is of being able to allocate how much safety margin in time at the position (x, y). The risk of driving is calculated for example by substituting $T_{mergin}$ in the abovementioned $f(x)$.

Since in any of the manners of calculation explained above, the degree of crossing between the vehicle 2 and each environment factor on the time axis at a predetermined position is evaluated, a risk-of-driving map equivalent to the abovementioned manner using time probability distributions can be constructed, and comparable effects can be obtained.

It should be noted that since if risks of driving are evaluated using representative points and/or representative values, the result of prediction about movement of each environment factor calculated at Step S504 often indicates a representative point and/or representative value itself, it is not always necessary to generate the environment factor time-of-presence range map at Step S506. In that case, Step S506 is skipped, and at Step S507 the risk of driving may also be calculated directly from the own vehicle time-of-presence range map and the result of prediction about movement of each environment factor.

In this manner, according to the present embodiment, risks are evaluated based on overlaps between time-of-presence ranges of the vehicle 2 and environment factors for each position surrounding the vehicle 2. Thereby, since a crossing relationship on the time axis between the vehicle 2 and each environment factor can be evaluated correctly, the risk of driving can be calculated highly precisely in a manner reflecting actual conditions.

In addition, according to the present embodiment, the risks of driving at any position on a risk-of-driving map can be evaluated without using driving trajectories of the vehicle 2 and/or each environment factor as premises. Because of this, it is possible to cope with evaluation as to whether every possible driving trajectory is good or bad in driving trajectory planning.

In addition, according to the present embodiment, a risk-of-driving map in which crossing relationships on the time axis are reflected in the index which is risks of driving such that they are represented in a space can be obtained for a state space that should be represented by coordinates (x, y) and the time t. That is, it provides an effect of reducing the degree of the state space from three with which a three-dimensional space is represented using variables x, y, t to two with which a two-dimensional space is represented using variables x, y. Accordingly, the calculation amount for calculating a desirable solution (for example, a safe and comfortable driving trajectory of the vehicle 2) can be reduced. Thereby, even in the case where an approximate solution is determined in a conventional method since search for a solution does not complete within a predetermined length of time, it might become possible to complete calculation for obtaining an optimum solution within a predetermined length of time or obtain a better approximate solution by using the present embodiment. This is realized because a risk-of-driving map according to the present embodiment allows representation of a crossing relationship on the time axis between the vehicle 2 and each environment factor highly precisely. In addition, because of this, in providing information about a risk-of-driving map in the present embodiment, it is not necessary to add information about the time axis related to environment factors (movement prediction information). On the other hand, since if in conventional manners it is attempted to evaluate a crossing relationship on the time axis between the vehicle 2 and each environment factor highly precisely, it is necessary to separately perform evaluation on the time axis, addition of movement prediction information, which is unnecessary in the present embodiment, becomes necessary.

According to one embodiment of the present invention explained above, the following actions and effects can be attained.

(1) The surrounding environment recognizing apparatus 10 is mounted on the vehicle 2, and recognizes a surrounding environment of the vehicle 2. The surrounding environment recognizing apparatus 10 includes: the own vehicle information acquiring unit 101 that acquires own vehicle information about motion of the vehicle 2; the surrounding environment factor acquiring unit 102 that acquires surrounding environment factor information about an environment factor around the vehicle 2; the time-of-presence range determining unit 104 that determines, based on the own vehicle information, an own vehicle time-of-presence range representing a time-of-presence range of the vehicle 2 for each position around the vehicle 2; and the risk-of-driving determining unit 105 that determines a risk of driving in an area around the vehicle 2 based on the own vehicle time-of-presence range and the surrounding environment factor information. Because of this, the risk of driving of the vehicle 2 can be evaluated highly precisely considering changes over time of the surrounding environment of the vehicle 2.

(2) The time-of-presence range determining unit 104 determines an environment factor time-of-presence range representing the time-of-presence range of an environment factor for each position around the vehicle 2 based on the surrounding environment factor information. The risk-of-driving determining unit 105 determines the risk of driving in an area around the vehicle 2 based on the own vehicle time-of-presence range and environment factor time-of-presence range. Because of this, the risk of driving of the vehicle 2 can be evaluated highly precisely considering changes over time of the surrounding environment factor around the vehicle 2.

(3) The own vehicle time-of-presence range determined by the time-of-presence range determining unit 104 as shown in the graphs 921 to 923 in FIG. 10 and the graphs 1221 to 1223 in FIG. 13 represents a range of time in which the vehicle 2 can be present at each position or a distribution of probabilities that the vehicle 2 can be at each position at certain times. Likewise, the environment factor time-of-presence range determined by the time-of-presence range determining unit 104 represents a range of time in which an environment factor can be present at each position or a distribution of probabilities that the environment factor can be at each position at certain times. Because of this, the state space corresponding to motion of the vehicle 2 or an environment factor can be represented appropriately as the own vehicle time-of-presence range or environment factor time-of-presence range.

(4) The risk-of-driving determining unit 105 can determine a risk of driving based on the difference between a representative value of the own vehicle time-of-presence range and a representative value of the environment factor time-of-presence range. In this case, the risk of driving is preferably determined such that the value of the risk of driving decreases as the difference between the representative value of the own vehicle time-of-presence range and the representative value of the environment factor time-of-presence range increases. In addition, the representative value of the own vehicle time-of-presence range can be any of the mode, median, minimum value or maximum value of the own vehicle time-of-presence range, and the representative value of the environment factor time-of-presence range can be any of the mode, median, minimum value or maximum value of the environment factor time-of-presence range. Because of this, the risk of driving of the vehicle 2 can be determined appropriately according to positional changes over time of the vehicle 2 and/or environment factors.

(5) In addition, the risk-of-driving determining unit 105 may also be configured to be able to determine a risk of driving based on a degree of overlap between an own vehicle time-of-presence range for each position and a position of an environment factor represented by surrounding environment factor information and/or based on a degree of overlap between an own vehicle time-of-presence range and an environment factor time-of-presence range for each position. Because of this also, the risk of driving of the vehicle 2 can be determined appropriately according to positional changes over time of the vehicle 2 and/or environment factors.

(6) The surrounding environment recognizing apparatus 10 further includes the environment factor movement predicting unit 103 that predicts movement of an environment factor based on surrounding environment factor information. The time-of-presence range determining unit 104 determines an environment factor time-of-presence range based on results of prediction about movement of environment factors made by the environment factor movement predicting unit 103. Because of this, the environment factor time-of-presence range can be determined appropriately considering motion of environment factors.

(7) The surrounding environment recognizing apparatus 10 further includes the risk-of-driving map creating unit 106 that creates a risk-of-driving map representing a relationship between each position around the vehicle 2 and a risk of driving, and the risk-of-driving map providing unit 107 that outputs the created risk-of-driving map to the outside. The risk-of-driving map represents the value of the risk of driving of the vehicle 2 at each position around the vehicle 2. Because of this, it is possible to make a crossing relationship on the time axis between the vehicle 2 and each environment factor reflected in an index which is the risk of driving, and provide a risk-of-driving map showing a result of evaluation of the risk of driving of the vehicle 2 in an easy-to-understand manner in a two-dimensional space.

(8) The risk-of-driving determining unit 105 determines the risk of driving for each position in a predetermined range that is set using the position of the vehicle 2 as the reference point. Because of this, irrespective of the driving trajectory of the vehicle 2, the risk of driving for each position around the vehicle 2 can be determined, and every possible driving trajectory that can be expected in driving trajectory planning of the vehicle 2 can be evaluated unitarily.

The embodiments explained above are examples, and the present invention is not limited to them. That is, various applications are possible, and every possible embodiment is included in the scope of the present invention.

For example, although in the abovementioned embodiment each process of the surrounding environment recognizing apparatus 10 is realized by using a processor and a RAM to execute a predetermined operation program, it is also possible to realize each process using distinctive hardware as necessary. In addition, although in the abovementioned embodiment the surrounding environment recognizing apparatus 10, own vehicle position determining apparatus 30, external sensor group 40, vehicle sensor group 50, map information managing apparatus 60, driving control apparatus 70, in-vehicle HMI apparatus 80 and actuator group 90 are each described as a separate apparatus, any two or more apparatuses may be combined as necessary.

In the case where each of the abovementioned processes is realized by a processor executing a predetermined operation program, information such as an operation program, a table or a file for realizing each process can be stored on storage devices such as a nonvolatile semiconductor memory, a hard disk drive or a SSD (Solid State Drive), or a non-transitory data storage medium such as an IC card, an SD card or a DVD that can be read by a computer.

In addition, each figure shows control lines and information lines that are deemed to be necessary for explaining embodiments, and all the control lines and information lines to be included in actual products to which the present invention is applied are not necessarily shown therein. It is also allowed to deem that actually almost all the configurations are interconnected.

The embodiments and/or various variants explained above are merely examples, and the present invention is not limited to the contents of them as long as features of the present invention are not impaired. In addition, although in the abovementioned explanation, a variety of embodiments are explained, the present invention is not limited to the contents of them. Other aspects that are conceivable within the scope of the technical ideas of the present invention are also included in the scope of the present invention.

The contents disclosed by the following priority basic application are incorporated herein as a citation.

Japanese Patent Application No. 2016-120935 (filed on Jun. 17, 2016)

LIST OF REFERENCE SIGNS

1: driving control system; 2: vehicle; 10: surrounding environment recognizing apparatus; 30: own vehicle position determining apparatus; 40: external sensor group; 50: vehicle sensor group; 60: map information managing apparatus; 70: driving control apparatus; 80: in-vehicle HMI apparatus; 90: actuator group; 100: processing unit; 101: own vehicle information acquiring unit; 102: surrounding environment factor acquiring unit; 103: environment factor movement predicting unit; 104: time-of-presence range determining unit; 105: risk-of-driving determining unit; 106: risk-of-driving map creating unit; 107: risk-of-driving map providing unit; 120: storage unit; 121: own vehicle information data group; 122: surrounding environment factor information data group; 123: time-of-presence range data group; 124: risk-of-driving map data group; 130: communicating unit

The invention claimed is:

1. A surrounding environment recognizing apparatus that is mounted on a vehicle and recognizes a surrounding environment of the vehicle, the surrounding environment recognizing apparatus comprising:
an own vehicle information acquiring unit that acquires own vehicle information about motion of the vehicle;
a surrounding environment factor acquiring unit that acquires surrounding environment factor information about an environment factor around the vehicle;
a time-of-presence range determining unit that determines, based on the own vehicle information, an own vehicle time-of-presence range representing a time-of-presence range of the vehicle for each position around the vehicle; and
a risk-of-driving determining unit that determines a risk of driving in an area around the vehicle based on the own vehicle time-of-presence range and the surrounding environment factor information.

2. The surrounding environment recognizing apparatus according to claim 1,
wherein the time-of-presence range determining unit determines, based on the surrounding environment factor information, an environment factor time-of-presence range representing a time-of-presence range of the environment factor for each position around the vehicle, and
the risk-of-driving determining unit determines a risk of driving in an area around the vehicle based on the own vehicle time-of-presence range and the environment factor time-of-presence range.

3. The surrounding environment recognizing apparatus according to claim 2, wherein the environment factor time-of-presence range represents a range of time in which the environment factor can be present at the each position or a distribution of probabilities that the environment factor can be at the each position at certain times.

4. The surrounding environment recognizing apparatus according to claim 3, wherein the risk-of-driving determining unit determines the risk of driving based on a degree of overlap between the own vehicle time-of-presence range at the each position and the environment factor time-of-presence range.

5. The surrounding environment recognizing apparatus according to claim 2, wherein the risk-of-driving determining unit determines the risk of driving based on a difference between a representative value of the own vehicle time-of-presence range and a representative value of the environment factor time-of-presence range.

6. The surrounding environment recognizing apparatus according to claim 5, wherein the risk-of-driving determining unit determines the risk of driving such that a value of the risk of driving decreases as the difference between the representative value of the own vehicle time-of-presence range and the representative value of the environment factor time-of-presence range increases.

7. The surrounding environment recognizing apparatus according to claim 5,
wherein the representative value of the own vehicle time-of-presence range is any of a mode, median, minimum value or maximum value of the own vehicle time-of-presence range, and
the representative value of the environment factor time-of-presence range is any of a mode, median, minimum value or maximum value of the environment factor time-of-presence range.

8. The surrounding environment recognizing apparatus according to claim 2, further comprising an environment factor movement predicting unit that predicts movement of the environment factor based on the surrounding environment factor information,
wherein the time-of-presence range determining unit determines the environment factor time-of-presence range based on a result of prediction about movement of the environment factor made by the environment factor movement predicting unit.

9. The surrounding environment recognizing apparatus according to claim 1, wherein the own vehicle time-of-presence range represents a range of time in which the vehicle can be present at the each position or a distribution of probabilities that the vehicle can be at the each position at certain times.

10. The surrounding environment recognizing apparatus according to claim 9, wherein the risk-of-driving determining unit determines the risk of driving based on a degree of overlap between the own vehicle time-of-presence range at the each position and a position of the environment factor represented by the surrounding environment factor information.

11. The surrounding environment recognizing apparatus according to claim 1, further comprising a risk-of-driving map creating unit that creates a risk-of-driving map representing a relationship between each position around the vehicle and the risk of driving.

12. The surrounding environment recognizing apparatus according to claim 11, further comprising a risk-of-driving map providing unit that outputs the risk-of-driving map,
wherein the risk-of-driving map represents a value of the risk of driving at the each position.

13. The surrounding environment recognizing apparatus according to claim 1, wherein the risk-of-driving determining unit determines the risk of driving for each position in a predetermined range that is set using a position of the vehicle as a reference point.

\* \* \* \* \*